(12) United States Patent
Smaragdis et al.

(10) Patent No.: US 8,380,331 B1
(45) Date of Patent: Feb. 19, 2013

(54) METHOD AND APPARATUS FOR RELATIVE PITCH TRACKING OF MULTIPLE ARBITRARY SOUNDS

(75) Inventors: Paris Smaragdis, Brookline, MA (US); Gautham J. Mysore, Stanford, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1114 days.

(21) Appl. No.: 12/261,931

(22) Filed: Oct. 30, 2008

(51) Int. Cl.
*G06F 17/00* (2006.01)

(52) U.S. Cl. .......... 700/94; 704/200; 704/231; 704/232; 702/127; 702/179; 702/180; 702/181; 708/400; 708/401; 708/402; 708/403; 708/404; 708/405; 84/603; 84/604; 84/607; 84/608; 84/609; 84/610; 84/613; 84/615; 84/616

(58) Field of Classification Search ...................... 700/94
See application file for complete search history.

(56) References Cited

U.S. PATENT DOCUMENTS

| | | | |
|---|---|---|---|
| 7,318,005 B1 | 1/2008 | Smaragdis et al. | |
| 7,480,640 B1 * | 1/2009 | Elad et al. | 706/14 |
| 8,060,512 B2 * | 11/2011 | Peng | 707/737 |
| 2003/0088401 A1 | 5/2003 | Terez | |
| 2004/0071363 A1 * | 4/2004 | Kouri et al. | 382/276 |
| 2006/0015263 A1 * | 1/2006 | Stupp et al. | 702/19 |
| 2008/0010038 A1 * | 1/2008 | Smaragdis et al. | 702/181 |
| 2008/0222734 A1 * | 9/2008 | Redlich et al. | 726/26 |
| 2011/0035215 A1 * | 2/2011 | Sompolinsky et al. | 704/231 |

OTHER PUBLICATIONS

D. Ellis, Prediction-Driven Computational Auditory Scene Analysis. PhD thesis, M.I.T., 1996.

M. Goto, "A real-time music-scene-description system: predominant-f0 estimation for detecting melody and bass lines in real-world audio signals," Speech Communication, vol. 43, No. 4, pp. 311-329, 2004.

A. T. Cemgil, H. J. Kappen, and D. Barber, "A Generative Model for Music Transcription," IEEE Trans. Audio, Speech and Language Processing, vol. 14, pp. 679-694, Mar. 2006.

J. C. Brown, "Calculation of a constant Q spectral transform," Journal of the Acoustical Society of America, vol. 89, Jan. 1991.

P. Smaragdis, B. Raj, and M. V. Shashanka, "Sparse and Shift-Invariant Feature Extraction From Non-Negative Data," in Proceedings IEEE International Conference on Audio and Speech Signal Processing, Apr. 2008.

Brown, J.C. "Musical fundamental frequency tracking using a pattern recognition method," in Journal of the Acoustical Society of America, vol. 92, No. 3, pp. 1394-1402, 1992.

Cheveigne, A. and H. Kawahara. "Yin, a fundamental frequency estimator for speech and music," in Journal of the Acoustical Society of America, 111(4). 2002.

(Continued)

*Primary Examiner* — Paul McCord
(74) *Attorney, Agent, or Firm* — Wolfe-SBMC

(57) ABSTRACT

Methods and apparatus for relative pitch tracking of multiple arbitrary sounds. A probabilistic method for pitch tracking may be implemented as or in a pitch tracking module. A constant-Q transform of an input signal may be decomposed to estimate one or more kernel distributions and one or more impulse distributions. Each kernel distribution represents a spectrum of a particular source, and each impulse distribution represents a relative pitch track for a particular source. The decomposition of the constant-Q transform may be performed according to shift-invariant probabilistic latent component analysis, and may include applying an expectation maximization algorithm to estimate the kernel distributions and the impulse distributions. When decomposing, a prior, e.g. a sliding-Gaussian Dirichlet prior or an entropic prior, and/or a temporal continuity constraint may be imposed on each impulse distribution.

45 Claims, 14 Drawing Sheets

OTHER PUBLICATIONS

Doval, B. and Rodet, X. 1991. "Estimation of Fundamental Frequency of Musical Sound Signals," in International Conference on Acoustics, Speech and Signal Processing, pp. 3657-3660.

Goto, M. 2000. "A Robust Predominant-F0 Estimation Method for Real-Time Detection of Melody and Bass Lines in CD Recordings," in Proceedings IEEE International Conference on Acoustics, Speech, and Signal Processing, Istanbul, Turkey, Jun. 2000.

Kalpuri, A. P. 1999. "Wide-band pitch estimation for natural sound sources with inharmonicities," in Proc. 106th Audio Engineering Society Convention, Munich, Germany, 1999.

Dempster, A.P, N.M. Laird, D.B. Rubin, 1977. "Maximum Likelihood from Incomplete Data via the EM Algorithm" Journal of the Royal Statistical Society, B, 39,1-38. 1977.

Brand, M.E.. "Structure learning in conditional probability models via an entropic prior and parameter extinction," Neural Computation. 1999.

Shashanka, M.V., B. Raj, and P. Smaragdis. "Sparse Overcomplete Latent Variable Decomposition of Counts Data," in Neural Information Processing Systems, Dec. 2007.

Corless, R.M., et al., "On the Lambert W Function," Advances in Computational Mathematics, vol. 5, 1996, pp. 329-359.

Ozgur Izmirli, et al., "A Multiple Fundamental Frequency Tracking Algoirthm.", 1996.

A. Klapuri, "Multipitch Analysis of Polyphonic Music and Speech Signals Using an Auditory Model," IEEE Trans. Audio, Speech and Language Processing, vol. 16, pp. 255-266, Feb. 2008.

Kedem, B, "Spectral Analysis and Discrimination by Zero-Crossings," Proceedings of the IEEE, Nov. 1986.

Moorer, J.A., "On the Transcription of Musical Sound by Computer," Computer Music Journal, vol. 1, No. 4, Nov. 1977, pp. 32-38.

* cited by examiner

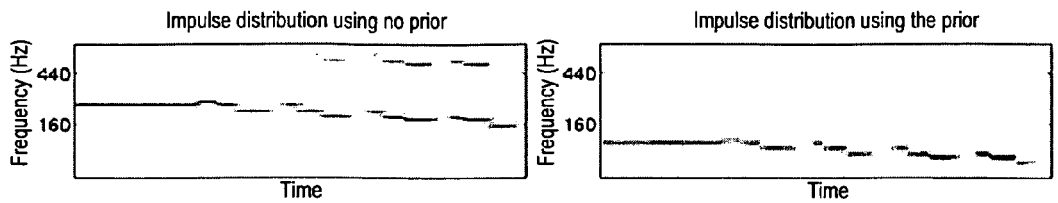
Figure 7A  Figure 7B
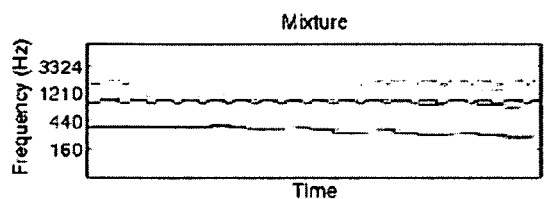
Figure 8A
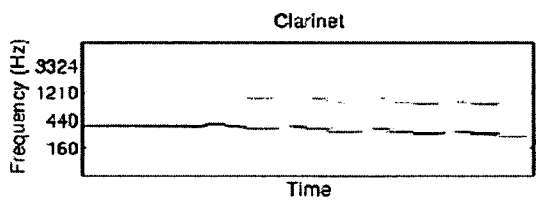  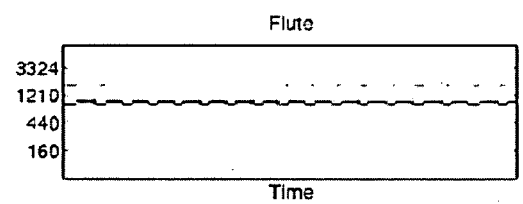
Figure 8B  Figure 8C
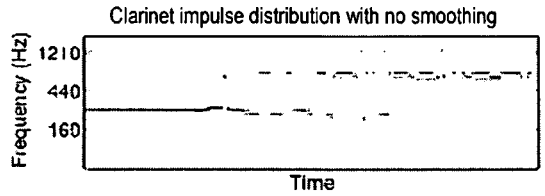  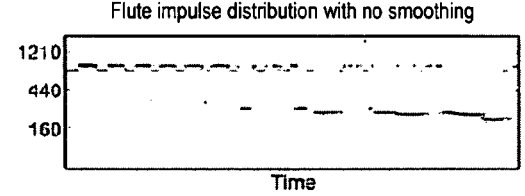
Figure 8D  Figure 8E
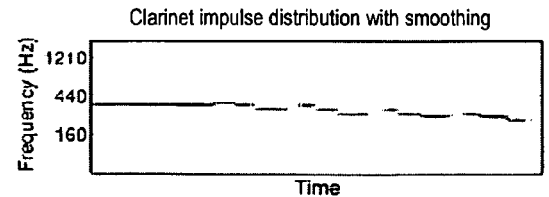  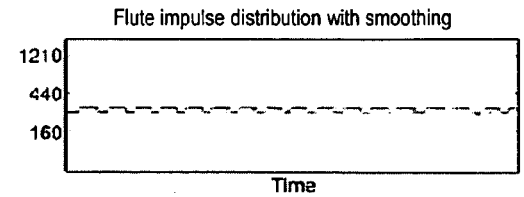
Figure 8F  Figure 8G

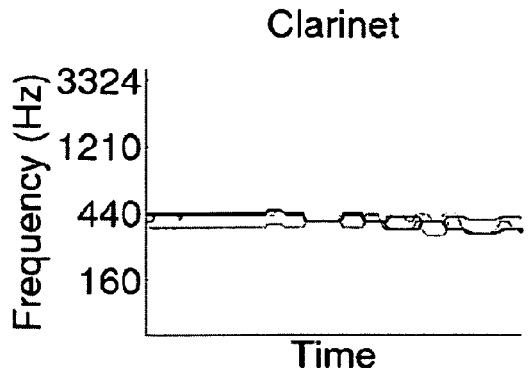
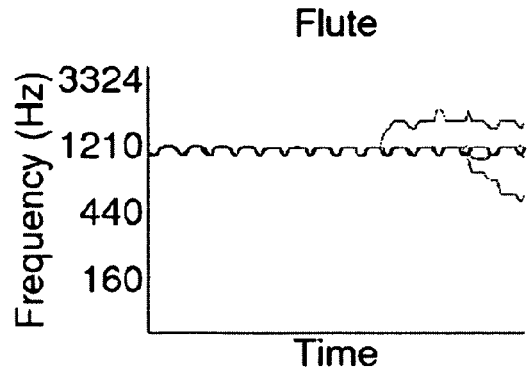
Figure 10A
Figure 10B
| Clarinet and Flute | $\mu_1$ | $\sigma_1$ | $\mu_2$ | $\sigma_2$ |
|---|---|---|---|---|
| Metric 1 Error (percent) | 2.22 | 7.61 | 1.06 | 5.41 |
| Metric 2 Error (bin #) | 0.15 | 0.9 | 0.21 | 1.54 |
| Flute and Horn | $\mu_1$ | $\sigma_1$ | $\mu_2$ | $\sigma_2$ |
| Metric 1 Error (percent) | 4.12 | 7.48 | 6.89 | 15.82 |
| Metric 2 Error (bin #) | 0.25 | 0.83 | 0.45 | 3.2 |
| Clarinet and Oboe | $\mu_1$ | $\sigma_1$ | $\mu_2$ | $\sigma_2$ |
| Metric 1 Error (percent) | 26.91 | 13.28 | 10.74 | 9.69 |
| Metric 2 Error (bin #) | 2.58 | 4.28 | 1.92 | 5.85 |
Figure 11

METHOD AND APPARATUS FOR RELATIVE PITCH TRACKING OF MULTIPLE ARBITRARY SOUNDS

BACKGROUND

Description of the Related Art

Pitch, as perceived by humans, is an elusive concept. Most trivially, pitch may be linked to the fundamental vibrating frequency of a sounding source or object. However, it is not difficult to find examples of aperiodic, or otherwise harmonically incoherent sounds where this assumption can break. Because of this vague notion of what exactly constitutes pitch, attempting to construct pitch tracks in terms of a series of instantaneous pitches is an inherently difficult endeavor.

In acoustics, pitch tracking has been approached using a variety of approaches, and continues to stir a considerable amount of research. Approaches to pitch track extraction have ranged from straightforward period estimation to sophisticated statistical methods, some employing time domain techniques and others sophisticated front-ends that reveal more of the pitch structure. The applications of pitch tracking cover a wide range of applications ranging from musical transcription, to emotion recognition in speech, to animal acoustics. To facilitate such a wide variety of applications, various biases may be imposed to facilitate a reasonable answer in the domain at hand.

Pitch estimation of concurrent multiple instruments is an ongoing pursuit in the world of musical signal processing. Although the problem of pitch estimation of a single instrument is for practical reasons a relatively easy problem to solve, when confronted with mixtures of instruments, conventional monophonic approaches are ill-equipped to estimate multiple pitch values from the input audio signals. This problem has been attacked using various methods based on auditory scene analysis, auditory models, Bayesian inference and model-based analysis, and also by employing source separation followed by monophonic pitch estimation on the separated outputs.

SUMMARY

Various embodiments of methods and apparatus for relative pitch tracking of multiple arbitrary sounds are described. Embodiments may approach the pitch tracking problem as a relative pitch problem. Instead of trying to estimate absolute pitch quantities at every point in time, embodiments instead track the changing of pitch across time. This is very similar to how pitch is perceived, as relative changes may be perceived, but not necessarily actual values. Further, embodiments may sidestep the issue of defining and estimating the actual pitch. Instead, embodiments may measure the relative change of rate across time, and through this infer relative pitch tracks. This may allow embodiments to deal with inharmonic or aperiodic sounds which in isolation do not have a clearly defined pitch, but when modulated create that perception.

In embodiments, a probabilistic method for pitch tracking may be implemented as or in a pitch tracking module. The pitch tracking module may receive an input signal. The input signal may be of various types and content. A constant-Q transform technique may be applied to the input signal to generate a constant-Q transform of the input signal. The constant-Q transform of the input signal may be decomposed to estimate one or more kernel distributions and one or more impulse distributions. Each kernel distribution represents a spectrum of a particular source in the input signal, and each impulse distribution represents a relative pitch track for a particular source in the input signal. Each impulse distribution corresponds to a respective one of the kernel distributions. In some embodiments, decomposing the constant-Q transform of the input signal may be performed according to shift-invariant probabilistic latent component analysis (PLCA). In some embodiments, decomposing the constant-Q transform of the input signal may include applying an expectation maximization (EM) algorithm to estimate the kernel distributions and the impulse distributions. In some embodiments, the EM algorithm may be applied as part of the shift-invariant PLCA.

In some embodiments, when decomposing the constant-Q transform of the input signal, a prior may be imposed on each impulse distribution so that the impulse distribution follows pitch expectations of a particular sound source. In one embodiment, a sliding-Gaussian Dirichlet prior may be used. In one embodiment, an entropic prior may be used. In some embodiments, when decomposing the constant-Q transform of the input signal, a temporal continuity constraint may be imposed on each impulse distribution. In one embodiment, a temporal continuity constraint may be implemented according to a Kalman filter type smoothing technique.

The one or more kernel distributions and the one or more impulse distributions may be displayed in graphical and/or textual format to a display device and/or stored to a storage device in graphical and/or textual format. In addition, the constant-Q transform may be displayed and/or stored in some embodiments.

BRIEF DESCRIPTION OF THE DRAWINGS

FIG. 7A illustrates an impulse distribution without the use of a prior, according to one embodiment.

FIG. 7B illustrates an impulse distribution of the same signal as FIG. 7A with the use of a sliding-Gaussian Dirichlet prior, according to one embodiment.

FIG. 8A shows an impulse distribution oscillating between two different instrument pitch tracks.

FIGS. 8B through 8G illustrate the effect of impulse distribution smoothing on multiple instruments, according to one embodiment.

FIGS. 10A and 10B illustrate overlay plots of aligned pitch tracks, according to one embodiment.

FIG. 11 is a table that presents results of error analysis for three data sets.

Figure 1:
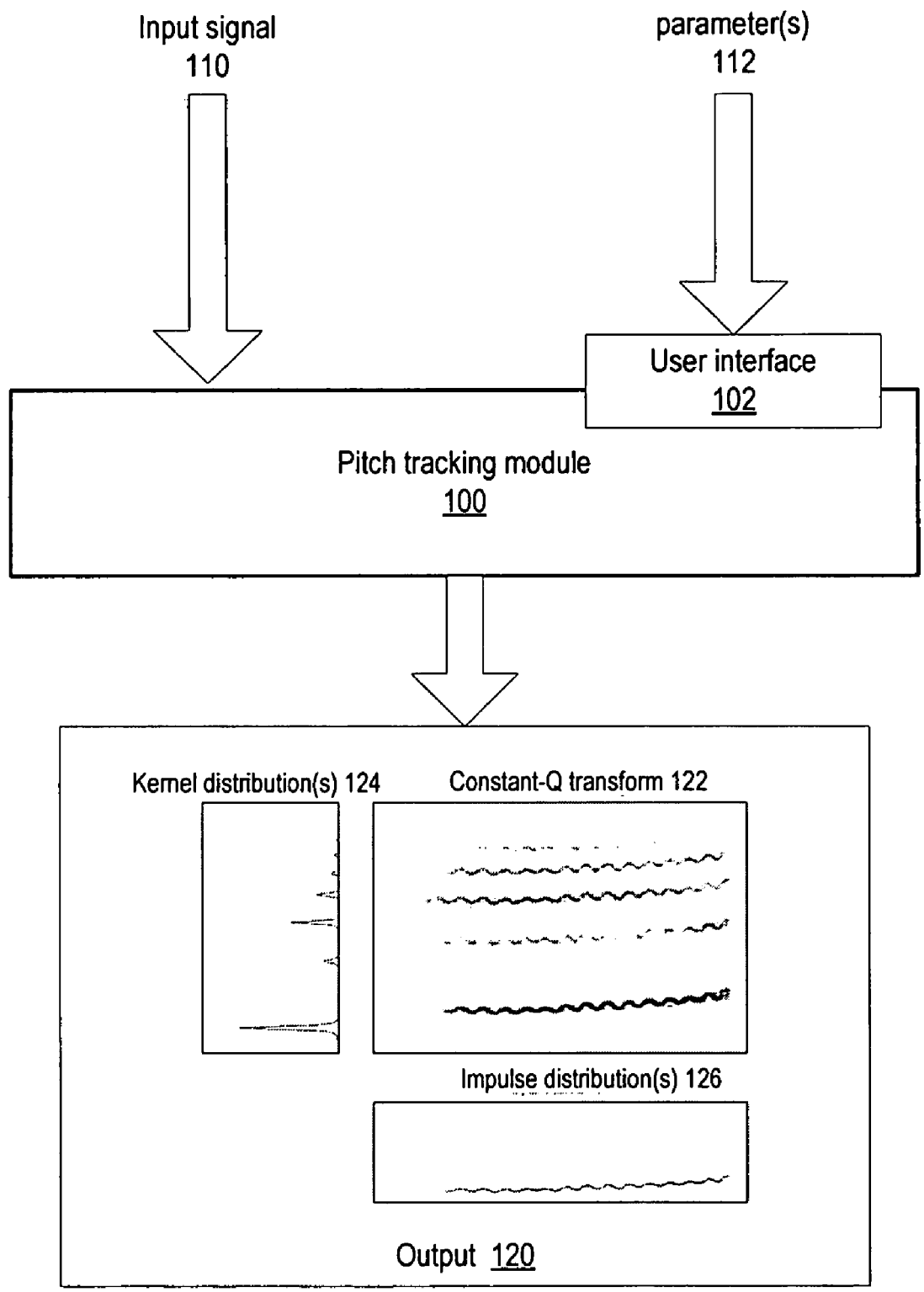
FIG. 1 illustrates a probabilistic pitch tracking method implemented as a module, and shows input and output to the module, according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of methods and apparatus for relative pitch tracking of multiple arbitrary sounds are described. Embodiments may extract pitch tracks from audio signals, including monophonic and polyphonic audio signals. Embodiments may extract, from an input audio signal, a pitch track corresponding to each of one or more sources, such as different musical instruments or different voices. Embodiments may be applied to monophonic signal input as well as to polyphonic or complex signal input including mixtures or combinations of audio signals produced from multiple sources. Embodiments may be more robust when processing polyphonic or other complex or ambiguous audio input than conventional methods. Embodiments may output results in a probabilistic format, which may allow more extensive processing and robustness, for example in the case of ambiguous signals. Embodiments may have multiple applications including but not limited to analyzing complex music and speech input in order to classify, manipulate, and separate individual signals or pitch tracks from the complex audio input.

Embodiments may implement a general, probabilistic method for pitch tracking that may make no assumptions about the nature of the input sound or the kind of pitch content at hand. Embodiments of the probabilistic pitch tracking method may implement an additive shift-invariant decomposition coupled with a constant-Q analysis front-end. The pitch tracking method allows soft decisions that may not result in deterministic estimates of pitch, but instead may provide a probability distribution describing the relative likelihood of various pitches. The probabilistic nature of this approach may be useful, for example, when integrating into systems with high uncertainty, and may allow the use of statistical methods to take advantage of domain knowledge, which can aid robust performance.

Embodiments of the probabilistic pitch tracking method may enable the tracking of pitch within mixtures. The assumption of clean input sounds is rarely valid in real recordings, and it is often the case that pitch tracks from noisy or multiple sources may need to be tracked. Embodiments of the pitch tracking method may extract relative pitch information, and thus may not provide an absolute pitch estimate at any point in time. Using this representation allows embodiments to deal with unpitched or inharmonic sounds whose absolute pitch value is hard to pinpoint, but that may be used to a melodic effect that is perceived in terms of relative pitch movements.

Embodiments may implement a method for the extraction of pitch tracks from audio signals that employs a probabilistic methodology that allows relative pitch tracking of aperiodic sounds, as well as tracking of multiple simultaneous tracks in the presence of sound mixtures. Embodiments may use a shift-invariant representation in the constant-Q domain, which allows the modeling of pitch changes as vertical shifts of spectra. This allows embodiments to track the pitch changes in sounds with an arbitrary spectral profile, even those where pitch would be an ill-defined quantity. In addition, embodiments may employ a mixture model that enables the simultaneous pitch tracking of multiple sounds.

Embodiments may implement a probabilistic method for pitch tracking that provides a flexible framework that may be extended in multiple ways. In embodiments, a prior may be imposed on the structure of the impulse distribution so that the impulse distribution follows the pitch expectations of a particular sound source. For example, for musical input, a prior may be imposed so that the impulse distribution follows the pitch expectations of the musical style at hand. In some embodiments, if a user is interested in temporally smoother pitch tracks, perhaps modeling the temporal behavior of a specific kind of source, the application of a dynamical system such as a Markov model may incorporate prior temporal knowledge in order to provide more appropriate results. Likewise, in some embodiments, rules on harmony and counterpoint may be used to allow polyphonic transcription.

The probabilistic method may also be useful if the spectral characteristics of the sounds that need to be tracked are known. In that case, a kernel distributions can be set and fixed to these values, as only the impulse distribution is updated. This is essentially a straightforward deconvolution process. The only constraint is that the output has to be positive and a probability distribution. This results in a more powerful and interpretable representation compared to a cross-correlation output that a straightforward deconvolution would produce.

Embodiments implement a probabilistic pitch tracking method that is flexible and thus can handle challenging situations when performing pitch tracking Results are presented herein which demonstrate the ability of the pitch tracking method to deal with sound mixtures, inharmonic sounds, and complex tracking situations. The pitch tracking method is implemented in a probabilistic framework that allows clean statistical reasoning and allows for extensions that incorporate statistical priors depending on the input signal.

Embodiments of the pitch tracking method as described herein may be implemented as or in a tool, module, library function, plug-in, stand-alone application, etc. For simplicity, implementations of embodiments of the method for pitch tracking may be referred to herein as a pitch tracking module. In some embodiments, the pitch tracking module may be integrated with, called by, or plugged into a digital audio processing application. Examples of digital audio processing applications may include, but are not limited to, Adobe™ Soundbooth™ or Adobe™ Audition™. "Adobe", "Soundbooth", and "Audition" are either registered trademarks or trademarks of Adobe Systems Incorporated in the United States and/or other countries.

Figure 17:
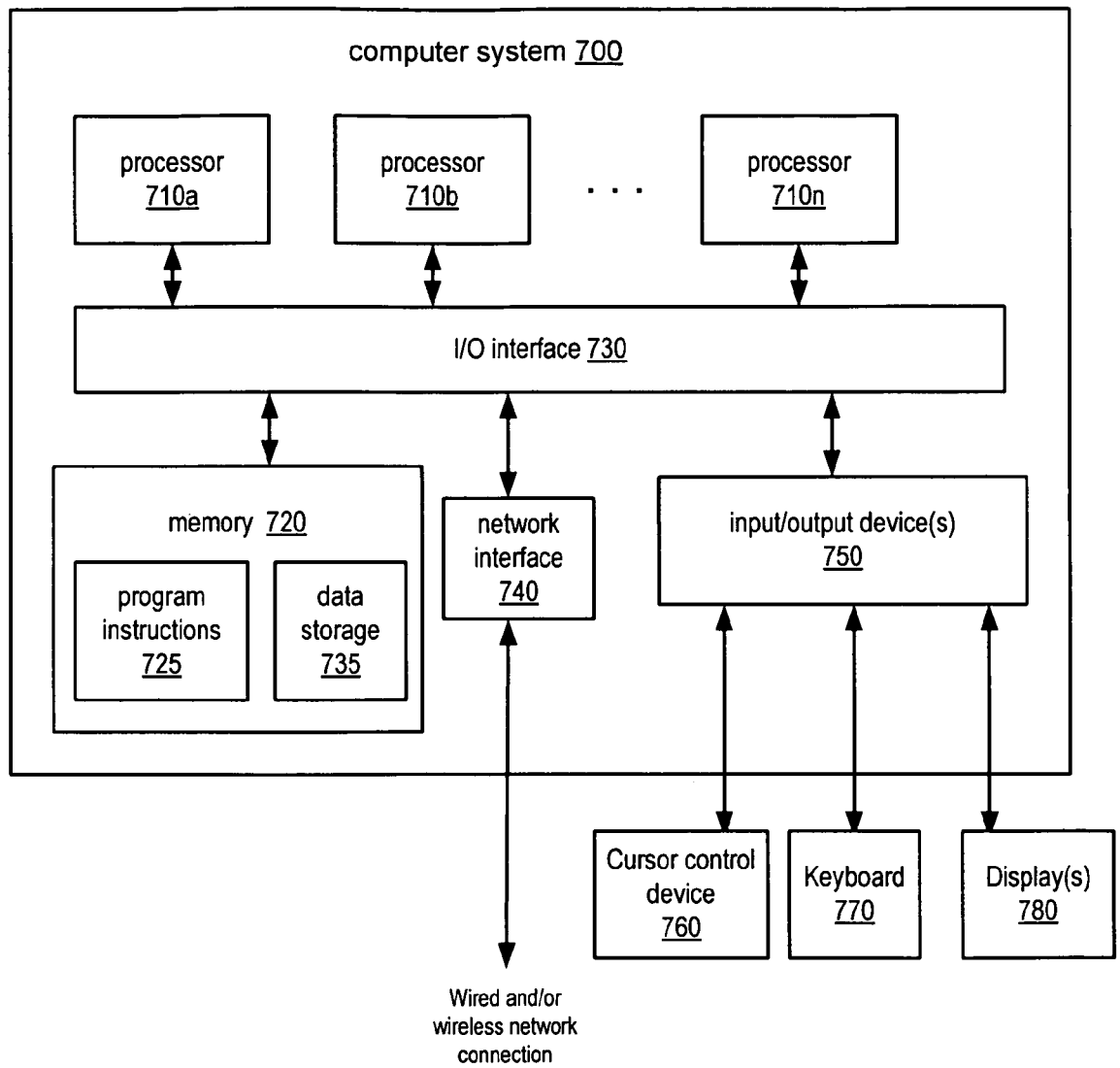
FIG. 17 illustrates an example computer system that may be used in embodiments.

FIG. 1 illustrates the probabilistic pitch tracking method implemented as a module, and shows input and output to the module, according to one embodiment. Pitch tracking module 100 or components thereof may be instantiated on one or more computer systems, which may interact with various other devices. One such computer system is illustrated by FIG. 17. Pitch tracking module 100 receives as input an audio signal 110. Signal 110 may, for example, be a digital audio file, a portion of a digital audio file, a digital audio stream, or a portion of a digital audio stream. Signal 110 may be a monophonic audio signal, polyphonic audio signal, or other complex or arbitrary audio signal.

Some embodiments of pitch tracking module 100 may provide a user interface 102 that provides one or more user interface elements that enable a user to, for example, specify or select an input signal 110 or a portion of an input signal 110 to be processed, and/or specify or select information or instructions for processing the input signal 110 or a portion thereof. As examples of information or instructions for processing the input signal 110 that may be specified or selected via the user interface 102, some embodiments may implement one or more of a sparsity prior technique, also referred to as an entropic prior, a prior distribution technique such as a sliding-Gaussian Dirichlet prior distribution, and an impulse distribution smoothing technique. Embodiments of user interface 102 may provide one or more user interface elements that allow a user to select or deselect application of one or more of these techniques for particular input signals 110, and/or that allow a user to select or specify values for input parameter(s) to one or more of these techniques for particular input signals 110.

To process an input signal 110, embodiments of pitch tracking module 100 may implement an unsupervised method that can process sound mixtures as well as monophonic inputs. Embodiments may implement an algorithm based on probabilistic latent component analysis that may be used, for example, for relative pitch estimation of an instrument in monophonic music or for relative pitch estimation of multiple instruments in polyphonic music. In one embodiment, the method operates on a constant-Q transform representation, which is decomposed by a deconvolution algorithm designed to find consistent spectral patterns and infer their pitch by observing their instantaneous shifts along the frequency axis. In embodiments, when applied to polyphonic music, a multilayered positive deconvolution may be performed concurrently on mixture constant-Q transforms to obtain a relative pitch track and timbral signature for each instrument. In order to make the estimation robust for mixtures, some embodiments may use a parameterized model of the shifting process as well as a smoothing technique, such as Kalman filter type smoothing, to enforce temporal continuity in the extracted pitch tracks. Embodiments may be applied to mixtures of two or more sounds sources such as musical instruments or voices while providing high levels of accuracy. Example embodiments of methods and algorithms that may be implemented in embodiments of pitch tracking module 100 are further described below.

Output 120 of pitch tracking module 100 may include, but is not limited to, a constant-Q transform 122 of input signal 110, one or more kernel distributions 124 each corresponding to a particular sound source in input signal 110, and one or more impulse distributions 126 each corresponding to a particular sound source in input signal 110. Impulse distribution(s) 126 correspond to the relative pitch track(s) of the sound sources in input signal 110, and kernel distribution(s) 124 correspond to the timbral signature(s), or spectral distributions, of the sound sources. Output 120 of pitch tracking module 100 may be displayed graphically and/or textually to a display device. In addition, in some embodiments, output 120 may be stored in text file format and/or graphic file format to a storage device.

Figure 2:
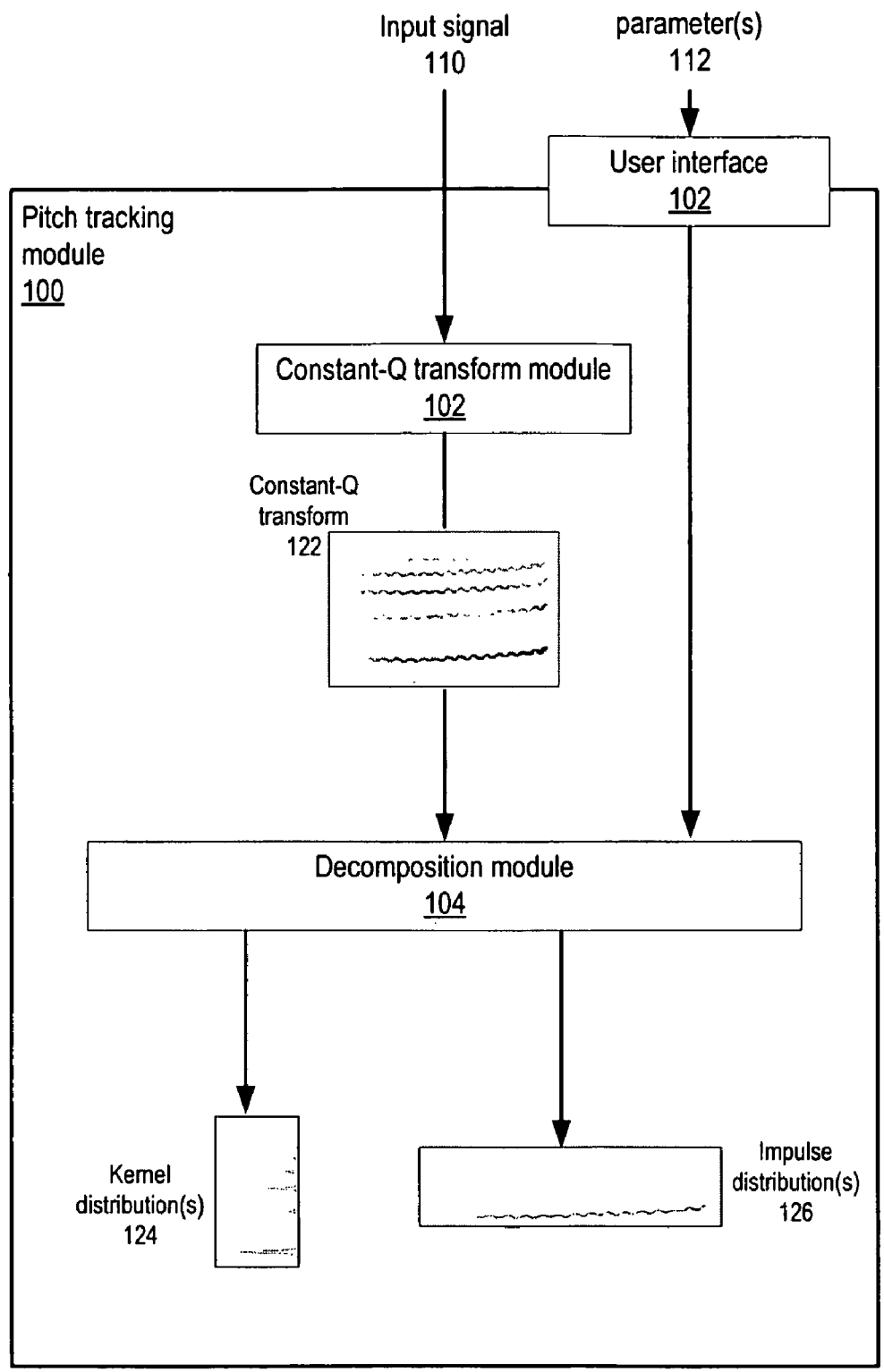
FIG. 2 illustrates data flow in a pitch tracking module according to some embodiments.

FIG. 2 illustrates data flow in pitch tracking module 100 according to some embodiments. Pitch tracking module 100 may receive an input signal 110. A constant-Q transform module 102 may apply a constant-Q transform technique to the input signal 110 to generate a constant-Q transform 122 of the input signal 110. Constant-Q transforms are further described below. While embodiments are described as using a constant-Q transform, it is to be noted that any frequency domain type transform that has the property that a change in pitch results in a vertical shift of the harmonic structure may be used in embodiments.

The constant-Q transform 122 of the input signal 110 may be decomposed by decomposition module 104 to estimate one or more kernel distributions 124 and one or more impulse distributions 126. Each kernel distribution 124 represents a spectrum of a particular source in the input signal, and each impulse distribution 126 represents a relative pitch track for a particular source in the input signal. Each impulse distribution 126 corresponds to a respective one of the kernel distributions 124. In some embodiments, decomposing the constant-Q transform of the input signal may be performed according to shift-invariant probabilistic latent component analysis (PLCA). In some embodiments, decomposing the constant-Q transform of the input signal may include applying an expectation maximization (EM) algorithm to estimate the kernel distributions and the impulse distributions. In some embodiments, the EM algorithm may be applied as part of the shift-invariant PLCA.

In some embodiments, when decomposing the constant-Q transform of the input signal, a prior may be imposed on each impulse distribution so that the impulse distribution follows pitch expectations of a particular sound source. In one embodiment, a sliding-Gaussian Dirichlet prior may be used. In one embodiment, an entropic prior may be used. In some embodiments, when decomposing the constant-Q transform of the input signal, a temporal continuity constraint may be imposed on each impulse distribution. In one embodiment, a temporal continuity constraint may be implemented according to a Kalman filter type smoothing technique.

In some embodiments, one or more values for parameters 112 used in the priors and/or in the smoothing technique, and/or values for parameters used in other processing, may be received via user interface 102.

The one or more kernel distributions 124 and the one or more impulse distributions 126 may be displayed in graphical and/or textual format to a display device and/or stored to a storage device in graphical and/or textual format. In addition, the constant-Q transform 122 may be displayed and/or stored in some embodiments.

Figure 3:
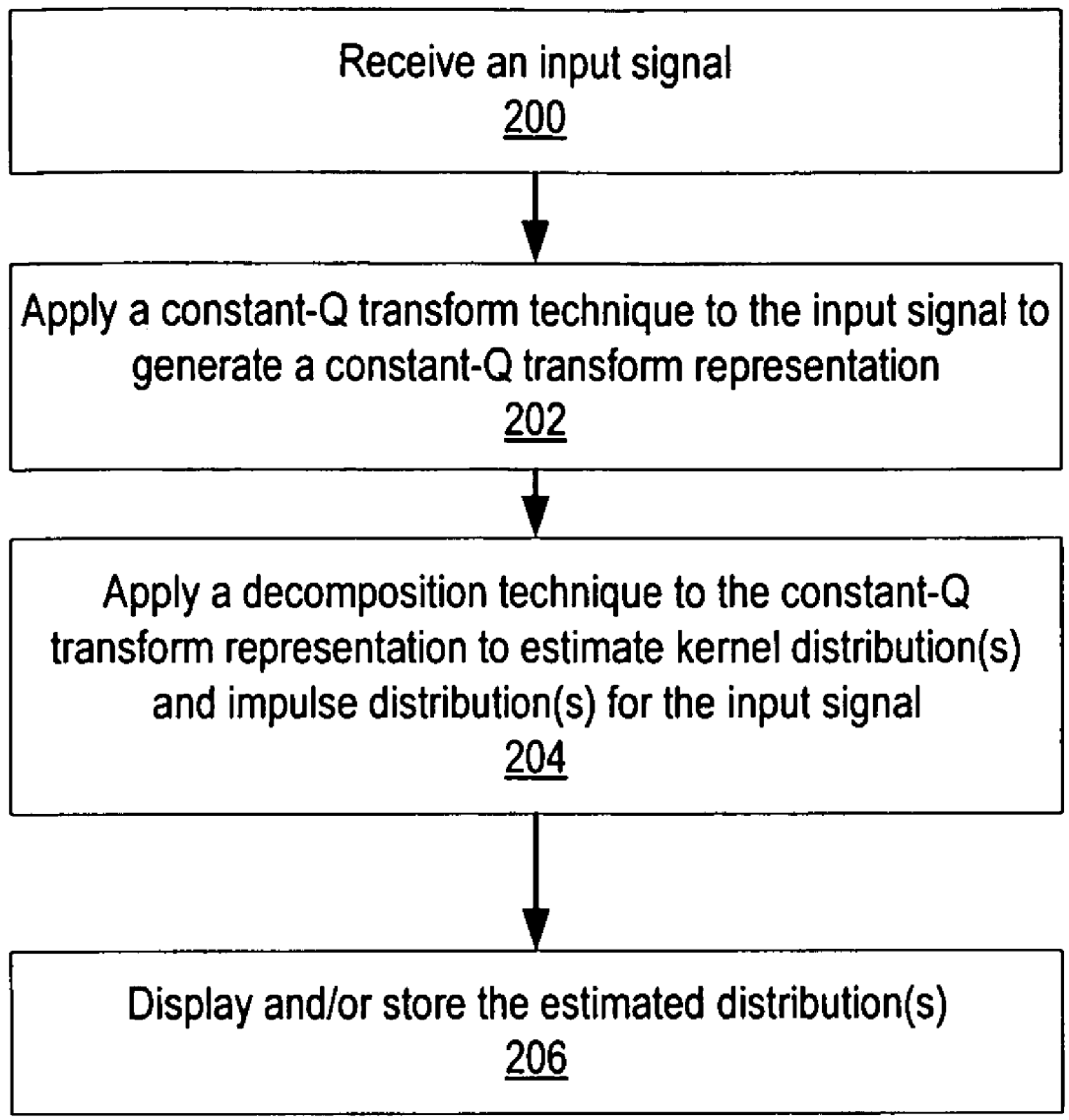
FIG. 3 is a flowchart of a probabilistic method for pitch tracking that may be implemented by a pitch tracking module according to some embodiments.

FIG. 3 is a flowchart of a probabilistic method for pitch tracking that may be implemented by pitch tracking module 100 according to some embodiments. As indicated at 200, pitch tracking module 100 may receive an input signal. The input signal may be of various types and content. For example, the input signal may be a single source, monophonic input signal in which the source generates one note at a time. The input signal may be inharmonic. The input signal may be a single source input signal in which the source plays multiple notes at one time. The input signal may include multiple different sources. At least two of the multiple different sources may play different melodies. Other examples of input signals are possible.

As indicated at 202, a constant-Q transform technique may be applied to the input signal to generate a constant-Q transform of the input signal. Constant-Q transforms are further described below. While embodiments are described as using a constant-Q transform, it is to be noted that any frequency domain type transform that has the property that a change in pitch results in a vertical shift of the harmonic structure may be used in embodiments.

As indicated at 204, the constant-Q transform of the input signal may be decomposed to estimate one or more kernel distributions and one or more impulse distributions. Each kernel distribution represents a spectrum of a particular source in the input signal, and each impulse distribution represents a relative pitch track for a particular source in the input signal. Each impulse distribution corresponds to a respective one of the kernel distributions. In some embodiments, decomposing the constant-Q transform of the input signal may be performed according to shift-invariant probabilistic latent component analysis (PLCA). In some embodiments, decomposing the constant-Q transform of the input signal may include applying an expectation maximization (EM) algorithm to estimate the kernel distributions and the impulse distributions. In some embodiments, the EM algorithm may be applied as part of the shift-invariant PLCA.

In some embodiments, when decomposing the constant-Q transform of the input signal, a prior may be imposed on each impulse distribution so that the impulse distribution follows pitch expectations of a particular sound source. In one embodiment, a sliding-Gaussian Dirichlet prior may be used. In one embodiment, an entropic prior may be used. In some embodiments, when decomposing the constant-Q transform of the input signal, a temporal continuity constraint may be imposed on each impulse distribution. In one embodiment, a temporal continuity constraint may be implemented according to a Kalman filter type smoothing technique.

As indicated at 206, the one or more kernel distributions and the one or more impulse distributions may be displayed in graphical and/or textual format to a display device and/or stored to a storage device in graphical and/or textual format. In addition, the constant-Q transform may be displayed and/or stored in some embodiments.

Probabilistic Method for Pitch Tracking

Various computations involved in embodiments of the probabilistic method for pitch tracking are described in more detail. It is to be noted that the following discussion is not intended to be limiting, as variations on the descriptions of these computations are possible.

Constant-Q Transform

Figure 4A:
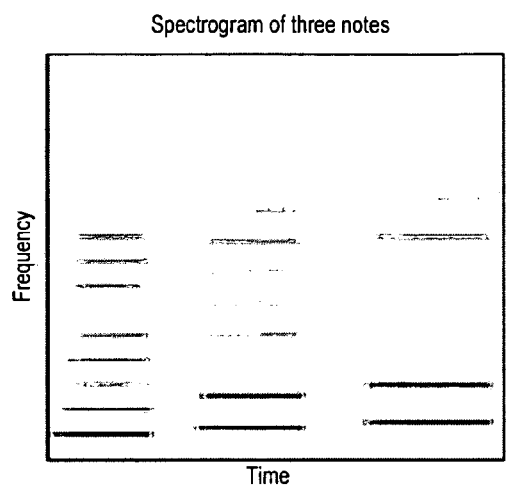
FIG. 4A illustrates a Fourier representation spectrogram of an input signal containing three different notes played by a saxophone.
Figure 4B:
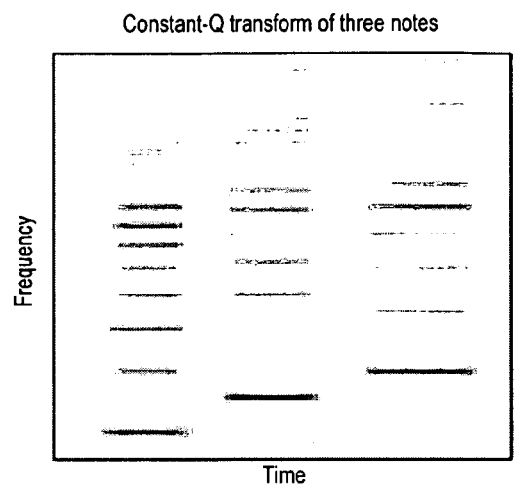
FIG. 4B illustrates a constant-Q transform of the input signal containing three different notes played by a saxophone according to one embodiment.

As noted above in reference to FIGS. 2 and 3, a constant-Q transform of an input signal may be generated. Thus, the initial representation used in some embodiments is the constant-Q transform. A constant-Q transform is a time-frequency representation with a logarithmically spaced frequency axis. A constant-Q transform may be defined such that each octave of available frequencies spans the same number of frequency bins. Examining the magnitude of a constant-Q transform results in visualizing the amount of acoustic energy at any point in the time/frequency plane. Due to the frequency spacing arrangement in constant-Q transforms, when analyzing pitched signals, pitch shifts may be represented as vertical shifts of roughly the same spectral template. This is different from a spectrographic representation such as a Fourier decomposition, which will additionally warp the spectral shape of an instrument as its pitch changes. This difference between a spectrogram of a Fourier decomposition and a constant-Q representation is shown in FIGS. 4A and 4B. FIG. 4A illustrates a Fourier representation spectrogram of three different notes played by a saxophone. The spacing between any two harmonics in the first note is different from the spacing between the two corresponding harmonics in the other notes. FIG. 4B illustrates a constant-Q transform of the same signal. The spacing between the harmonics is the same for all of the notes. In this representation a pitch shift is characterized by just a vertical shift of the frequency axis. In the constant-Q transform, notes at different pitches appear as shifted versions of the same spectral pattern. If the timbral structure of a given instrument is fairly consistent in a piece of music, the constant Q transform of the instrument can be seen as a convolution of the spectral pattern of that instrument with a function that offsets it appropriately to create the desired pitch effects.

The above observations are a starting point in defining the relative pitch tracking model implemented by embodiments. In the constant-Q transform, the major variation that distinguishes different notes of the same instrument is a simple shift along the frequency axis; embodiments track this shift and interpret it as a relative pitch track.

An underlying assumption is that the spectral shape of an individual sound is relatively constant as it changes pitch so that the measurement of the shift is feasible. Theoretical arguments on that point are difficult to make since the arguments would rely on the expected statistics on the inputs; however, this assumption holds well for sounds with widely varying spectral character as will be demonstrated.

Another observation is the approximate additivity of the magnitude constant-Q transform. The actual constant-Q transform results in a complex valued output and is a linear operation which maintains that the transform of the sum of two signals equals the sum of the transforms of the two signals. When the magnitude of the transform is computed, however, there is no guarantee of linearity, since for any pair of complex numbers $\{z_1, z_2\} \in \mathbb{C}, \|z_1\|+\|z_2\| \neq \|z_1+z_2\|$. However, when observing mixtures of multiple sounds, there is often a high degree of disjointedness in their spectra, and the likelihood of both sounds being significantly active at the same time/frequency cell is often very low. In addition, complete phase cancellations are rarely observed, so even in the cases where significant energy overlaps there may still be an effect roughly equal to addition. This assumption has been used for multiple audio processing systems, and is generally understood to be valid for practical purposes. Under this assumption, when the mixture of multiple notes is observed, the observed constant-Q transform may be expected to be composed of the addition of other constant-Q transforms that are appropriately composed of shifted spectra denoting each instrument or each note being played. This complicates the operation by requiring the tracking of potentially multiple spectra that shift independently. If the input is composed of the same sound exhibiting multiple simultaneous pitches (such as a polyphonic piano passage), then the same spectrum being shifted and overlaid accordingly for each note may be observed. For an example input of multiple instruments, it would be expected that each instrument has its own spectral shape which shifts and overlays accordingly. Embodiments may implement an algorithm that allows the tracking of these simultaneous changes in shift and enables embodiments to interpret them as a pitch change.

While embodiments are described as using a constant-Q transform, it is to be noted that any frequency domain type transform that has the property that a change in pitch results in a vertical shift of the harmonic structure may be used in embodiments.

Single Source Formulation

Starting with a constant-Q transform as described above, embodiments may discover shift invariant components across the ω dimension. In the simple case where one shifting spectrum is assumed, the single source formulation may be notated as follows:

$$P(\omega,t)=P_K(\omega)*P_I(f_0,t)$$

where $P(\omega, t)$ is the input magnitude constant-Q transform, $P_K(\omega)$ is a frequency distribution, $P_I(f_0, t)$ is a time/frequency distribution, and the star operator denotes convolution. The convolution is two-dimensional since the second operant is of that rank. $P_K(\omega)$ is the kernel distribution, and $P_I(f_0, t)$ is the impulse distribution. The kernel distribution $P_K(\omega)$ is a frequency distribution, e.g. a constant-Q spectrum or a prototypical vertical slice of a constant-Q transform. The impulse distribution $P_I(f_0, t)$ is a time/frequency distribution which is convolved with the kernel distribution. Due to this relationship the impulse distribution may be interpreted as expressing the likelihood that the kernel distribution will take place at any given frequency shift or time.

Kernel distribution 124 and impulse distribution 126 of output 120 in FIG. 1 is illustrative of desired output from analyzing the constant-Q transform 122. The impulse distribution 126 may be used to represent the pitch changes in the input signal 110. The kernel distribution 124 denotes the spectral character of the sound source, and impulse distribution 126 represents the corresponding impulse distribution or pitch track. Convolving these two distributions would approximate the input signal. The impulse distribution 126 graphically represents the pitch variations in a convenient manner. Under the assumption that the sound source is well defined by the kernel distribution 124, the impulse distribution 126 may be interpreted as a likelihood of pitch across time. Because the actual spectral character of the input sound is learned, no requirements that the source has to be harmonic or otherwise structured may need to be imposed as long as the pitch change is characterized by a shift in the frequency axis. As will be demonstrated, this enables the processing of arbitrary sounds in more complex input signals.

Multi-Source Formulation

For handling complex input signals, such as signals that contain multiple sounds with different spectra, the single-source model presented above may be generalized as described below.

Figure 5:
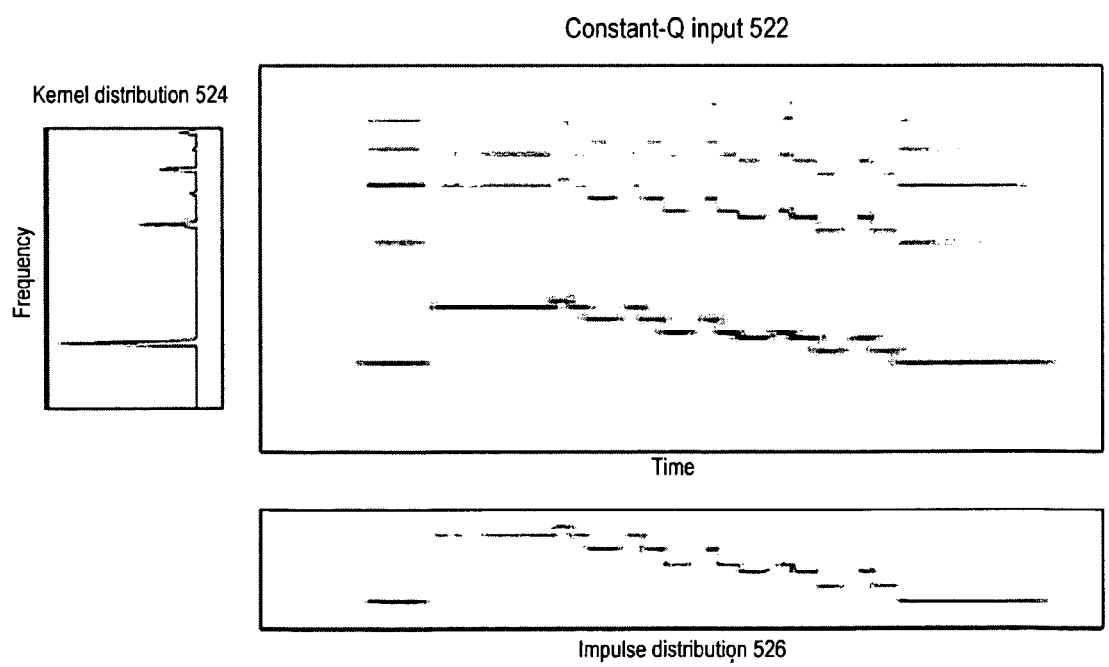
FIG. 5 illustrates shift-invariant probabilistic latent component analysis (PLCA) applied to a recording of a clarinet according to one embodiment.

Shift-invariant probabilistic latent component analysis (PLCA) is an algorithm used to extract shifted structure in multi-dimensional non-negative data, and may be used in some embodiments. When applied to a constant-Q transform of a mixture of sound sources such as a musical track with multiple instruments, shift-invariant PLCA may be used to decompose the input signal into a summation of convolutions of one spectrum and one pitch track for each instrument. FIG. 5 illustrates shift-invariant PLCA applied to a recording of a clarinet according to one embodiment. Constant-Q input 522 illustrates the constant-Q transform of a clarinet recording. Impulse distribution 526 illustrates the impulse distribution after applying shift-invariant PLCA, and kernel distribution 524 illustrates the corresponding kernel distribution. Convolving the kernel distribution 524 and the impulse distribution 526 will approximately reconstruct the input constant-Q transform 522.

More specifically, the spectral signature of the z-th instrument may be denoted as a probability distribution referred to as the kernel distribution $P_K(\tau_f|z)$, and the pitch track of the same instrument may be defined as a probability distribution referred to as the impulse distribution $P_I(f', t|z)$. The constant-Q transform of the given instrument is therefore the convolution of these two distributions (see FIG. 5):

$$V_{ft|z}=P_K(\tau_f|z)*P_I(f',t|z)$$

When there is a mixture, one $V_{ft|z}$ may be observed for each instrument, and the $V_{ft|z}$ for all of the instruments may be superimposed to construct the constant-Q input at hand. The mixing proportion may be modeled as one more probability distributions $P(z)$. The model for the constant-Q transform of the mixture is therefore:

$$V_{ft} = \sum_z P(z) \sum_{\tau_f} P_K(\tau_f \mid z) P_I(f - \tau_f, t \mid z)$$

Since there are latent variables in this model, in one embodiment, a variant of the expectation maximization (EM) algorithm may be employed to estimate the distributions. The latent variables are $\tau_f$ (or $f'$ since $f=\tau_f+f'$), which represents shift, and z, which represents the mixture weights. In the expectation (E) step, the contribution of a specific location of the impulse distribution $(f', t)$ of a given instrument z, to location $(f, t)$ of the mixture constant-Q transform may be estimated:

$$R(f, t, f', z) = \frac{P(z)P_I(f', t \mid z)P_K(f - f' \mid z)}{\sum_z P(z) \sum_{f'} P_I(f', t \mid z) P_K(f - f' \mid z)}$$

In the above equation, the latent variables are $f'$ and z. The same value of this function may be obtained by modeling the latent variables as $f'$ and z. The E-step equation then becomes:

$$R(f, t, \tau_f, z) = \frac{P(z)P_I(f - \tau_f, t \mid z)P_K(\tau_f \mid z)}{\sum_z P(z) \sum_{\tau_f} P_I(f - \tau_f, t \mid z) P_K(\tau_f \mid z)} \quad (1)$$

The maximization (M) step equations may be given by the following update equations:

$$P_I^*(f', t \mid z) = \frac{\sum_f V_{ft} R(f, t, f', z)}{\sum_{f'} \sum_t \sum_f V_{ft} R(f, t, f', z)} \quad (2)$$

-continued $$P_K^*(\tau_f \mid z) = \frac{\sum_f \sum_t V_{ft} R(f, t, \tau_f, z)}{\sum_{\tau_f} \sum_f \sum_t V_{ft} R(f, t, \tau_f, z)}$$

$$P^*(z) = \frac{\sum_{f'} \sum_t \sum_f V_{ft} R(f, t, f', z)}{\sum_z \sum_{f'} \sum_t \sum_f V_{ft} R(f, t, f', z)}$$

The above equations may be iterated until convergence.

A number of different impulse/kernel distribution decompositions may combine to give the same constant-Q transform. A vertical shift of one distribution towards one direction may be annulled by a vertical shift of the other distribution towards the other direction. Due to this uncertainty, embodiments may only extract a "relative pitch" track as opposed to an absolute pitch measurement. Some embodiments may provide a processing technique to align the track and obtain the absolute pitch if necessary or desired. Various methods of performing this processing are possible.

Ideally, the impulse distribution at each time step would be a shifted and scaled delta function. The position of its peak would then give the pitch at a given time step. Since there is some amount of averaging involved in the estimation process, the impulse distribution is smoother than an impulse at each time step. If this distribution is unimodal at each time step, the pitch track may be estimated as its peak. This is however not always the case since the estimation is not required to be well-behaved. In order to ensure that each time step of the impulse distribution is a unimodal distribution with a clear peak value, some embodiments may employ a prior distribution technique. The prior distribution technique may be used in the estimation of the impulse distribution in the M-step of each iteration. In some embodiments, a sparsity constraint, or entropic prior, may be used. In some embodiments, a sliding-Gaussian Dirichlet prior distribution technique may be used.

Regarding the entropic prior and the sliding-Gaussian Dirichlet prior, some embodiments may apply one or the other depending on the nature of the input signal. The entropic prior may be used in situations where one instrument is playing multiple notes at one time. However, the sliding-Gaussian Dirichlet prior explicitly looks for only one note at a time being played by each instrument. Thus, the entropic prior may allow multiple notes to co-exist within the track of one instrument. If tracking multiple instruments and using the sliding-Gaussian Dirichlet prior, then any one of the instruments at any one time may only play one note, but different instruments may also play notes at the same time.

Sparsity Constraints

The above-described model may be overcomplete. In other words, there may be more information in the model than is in the input. This may be a problem in that overcompleteness may result in output that is overfit to the input, or models that are hard to interpret. A particular instance of this problem may be explained using the commutative property of convolution. For example, consider the constant-Q transform 122, kernel distribution 124 and impulse distribution 126 illustrated in FIG. 1. In this example, an output in which the impulse distribution was identical to the input and the kernel distribution was a delta function would also be a possible answer. However, that particular decomposition would not offer any additional information since the pitch track would be identical to the input. In addition, any arbitrary shift of information from one distribution to another that would lie between what is plotted and the outcome may result in an infinite set of correct solutions.

In order to regulate the potential increase of information from input to output, one embodiment may make use of an entropic prior. In one embodiment, this prior may take the form of:

$$P(\theta) \propto e^{-\beta H(\theta)}$$

where $H(\cdot)$ is entropy and $\theta$ can be any distribution from the ones estimated in the model. The parameter $\beta$ adjusts the amount of bias towards a high or a low entropy preference. A $\beta$ value which is less that zero may bias the estimation towards a high entropy (i.e. flatter) distribution, and a positive value may bias the estimation towards a low entropy (i.e. spikier) distribution. The magnitude of $\beta$ determines how important this entropic manipulation is; larger values will place more stress on entropic manipulation, whereas smaller values (values closer to 0) will place less stress on entropic manipulation. In the extreme case where $\beta=0$, the prior does not come into effect. In one embodiment, imposing this prior may be done by inserting an additional procedure in the M-step that enforces the use of this prior. In one embodiment, the additional step involves re-estimating the distribution in hand by:

$$\theta^{**} = \frac{-(\hat{\theta}^*)/\beta}{w(-(\hat{\theta}^*)e^{1+\lambda/\beta}/\beta)}$$

where $w(\cdot)$ is the Lambert W function, $\theta^{**}$ is the estimate of $\theta$ with the entropic prior, and $\hat{\theta}^*$ is the estimate according to equations (1) and (2) but without the division by $P(z)^*$. The quantity $\lambda$ comes from a LaGrangian due to the constraint that $\Sigma\theta_i=1$, which results in the expression:

$$\lambda = -\left[\frac{\hat{\theta}^*}{\theta_i^{}} + \beta + \beta \log \theta_i^{}\right]$$

These above two equations may be repeatedly evaluated in succession; the equations may converge to a stable estimate of $\theta$ after a relatively small number of iterations.

Figure 6A:
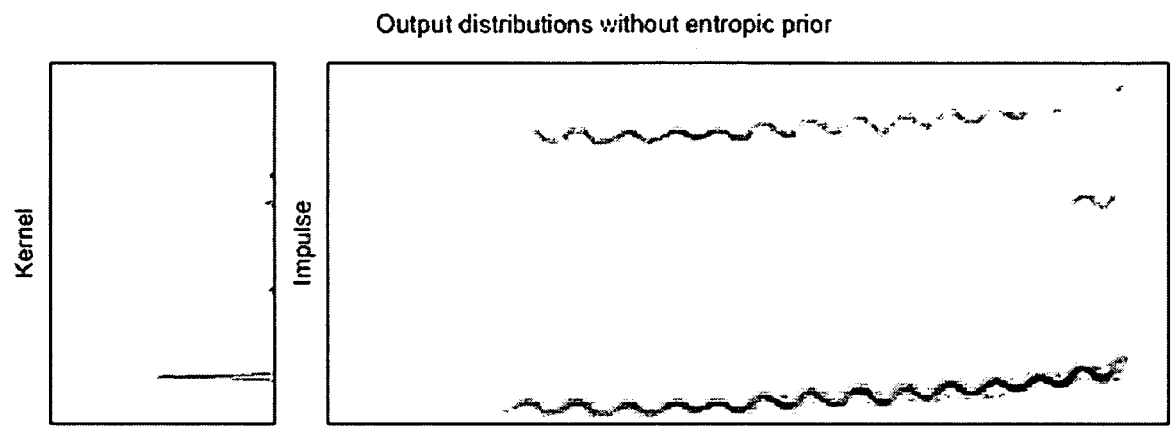
FIG. 6A illustrates example kernel and impulse distributions estimated without using an entropic prior according to one embodiment.
Figure 6B:
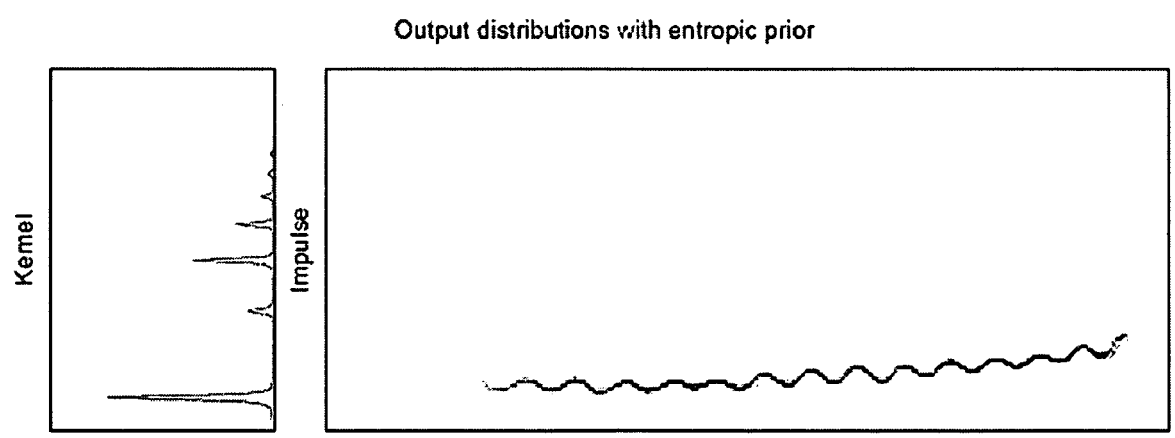
FIG. 6B illustrates the output obtained employing an entropic prior with a high entropy constraint on the kernel distribution and a low entropy constraint on the impulse distribution according to one embodiment.

For solving typical problems, it may be desirable to have a high entropy kernel distribution and a low entropy impulse distribution. This may tend to result in a pitch track that is refined, and a spectrum estimate that may account for most of the energy of the source's spectrum. FIGS. 6A and 6B illustrate the effect of the entropic prior according to one embodiment. FIG. 6A illustrates example kernel and impulse distributions estimated without using the entropic prior. FIG. 6B illustrates the output obtained employing the entropic prior with a high entropy constraint on the kernel distribution and a low entropy constraint on the impulse distribution. Biasing the learning towards a high entropy kernel and a low entropy impulse results in a clean and sparse pitch track, as opposed to the not readily interpretable pitch track learned when not using the prior.

In one embodiment, the low entropy bias may be strengthened by requiring the height of the impulse distribution to be only as big as the expected pitch range, therefore implying that values outside that range will be zero and thus lowering the entropy. This may result in faster training requiring convolutions of smaller quantities, but also may restrict the possible solutions to a range of interest, thus aiding in a speedier convergence. The convolutions involved may also be evaluated efficiently using a fast Fourier transform.

Sliding-Gaussian Dirichlet Prior

In order to deal with the potential non-unimodal nature of the impulse distribution at each time step, one embodiment may use a sliding-Gaussian Dirichlet prior distribution. The prior distribution may be used in the estimation of the impulse distribution in the M-step of each iteration, making this a maximum a posteriori (MAP) estimation. Embodiments may use the prior distribution to impose a prior belief that the impulse distribution of each instrument is unimodal at each time step, thus exhibiting a clear peak that can be interpreted as the pitch value at that time. The effect of using a sliding-Gaussian Dirichlet prior distribution can be seen in FIGS. 7A and 7B. FIG. 7A illustrates an impulse distribution without the use of the prior, while FIG. 7B illustrates an impulse distribution of the same signal with the use of a sliding-Gaussian Dirichlet prior. It can be seen in FIG. 7A that a harmonic is captured in the impulse distribution when no prior is used. The distribution becomes unimodal when the prior is used, as shown in FIG. 7B.

The hyperparameters of the Dirichlet prior at each time step therefore form a sampled and scaled Gaussian. The hyperparameters may be defined as follows:

$$\alpha(f', t \mid z) = \rho \frac{1}{\sqrt{2\pi\sigma^2}} e^{-\frac{(f'-\mu_{t|z})^2}{2\sigma^2}}$$

where $\rho$ is a variable parameter that allows us to decide the strength of the prior. The prior distribution for the impulse distribution of the zth instrument would then be:

$$P(\Lambda \mid z) = \frac{1}{\beta} \prod_{f',t} P_I(f', t \mid z)^{\alpha(f',t|z)}$$

where $\beta$ is a normalizing factor. The M-step equation to estimate the impulse distribution then becomes:

$$P_I^*(f', t \mid z) = \frac{\sum_f \left( V_{ft} R(f, t, f', z) + \rho' \frac{1}{\sqrt{2\pi\sigma^2}} e^{-\frac{(f'-\mu_{t|z})^2}{2\sigma^2}} \right)}{\sum_{f'} \sum_t \sum_f \left( V_{ft} R(f, t, f', z) + \rho' \frac{1}{\sqrt{2\pi\sigma^2}} e^{-\frac{(f'-\mu_{t|z})^2}{2\sigma^2}} \right)}$$

where $$\rho' = \frac{\rho}{\beta}.$$

It can be seen from the numerator of this equation that at each time step, the method is performing a blend of the previous (using no prior) unnormalized estimate of the impulse distribution and a Gaussian. The variance of the Gaussians, $\sigma^2$ is predetermined. The peak of the previous unnormalized estimate of the impulse distribution is used as the mean at each time step:

$$\mu_{t|z} = \text{argmax} \sum_f V_{ft} R(f, t, f', z)$$

Impulse Distribution Smoothing

A goal of the estimation is to obtain a separate relative pitch track for each instrument. In some cases, however, there may be a temporary switch between pitch tracks of different instruments in a given impulse distribution. This may be seen, for example, in FIG. 8A, where a given impulse distribution oscillates between two different instrument pitch tracks. At a given time step, the impulse distribution is predominantly unimodal (with the help of the prior). However, there are constant oscillations between pitch tracks as can be seen in FIG. 8A. In order to deal with this issue, in one embodiment, a temporal continuity constraint may be imposed on each impulse distribution so that large variations between consecutive time steps are discouraged. In one embodiment, this may be done by employing a Kalman filter type smoothing. Other embodiments may use other techniques. In one embodiment, the impulse distribution is multiplied at each time step with a Gaussian whose mean is the peak of the impulse distribution at the previous time step:

$$P_{I_{smooth}}^*(f', t \mid z) = P_I^*(f', t \mid z) \frac{1}{\sqrt{2\pi\sigma^2}} e^{-\frac{(f'-\mu_{t'-1|z})^2}{2\sigma^2}}$$

The variance $\sigma^2$ is predetermined. Once $P_{I_{smooth}}^*(f',t|z)$, is obtained, it is reassigned to $P_I^*(f',t|z)$, and the method continues with the next EM iteration.

FIGS. 8B through 8G illustrate the effect of impulse distribution smoothing on multiple instruments. Shift invariant PLCA is performed on the mixture data that is shown in FIG. 8A. FIGS. 8B and 8C illustrate constant-Q transforms of the individual instruments that combine to form the mixture. FIGS. 8D and 8E illustrate the resulting impulse distributions when temporal smoothing is not used. As can be seen, both impulse distributions contain elements of both instruments. FIGS. 8F and 8G show the resulting impulse distributions with the use of temporal smoothing.

Relative Pitch Tracking

Figure 9:
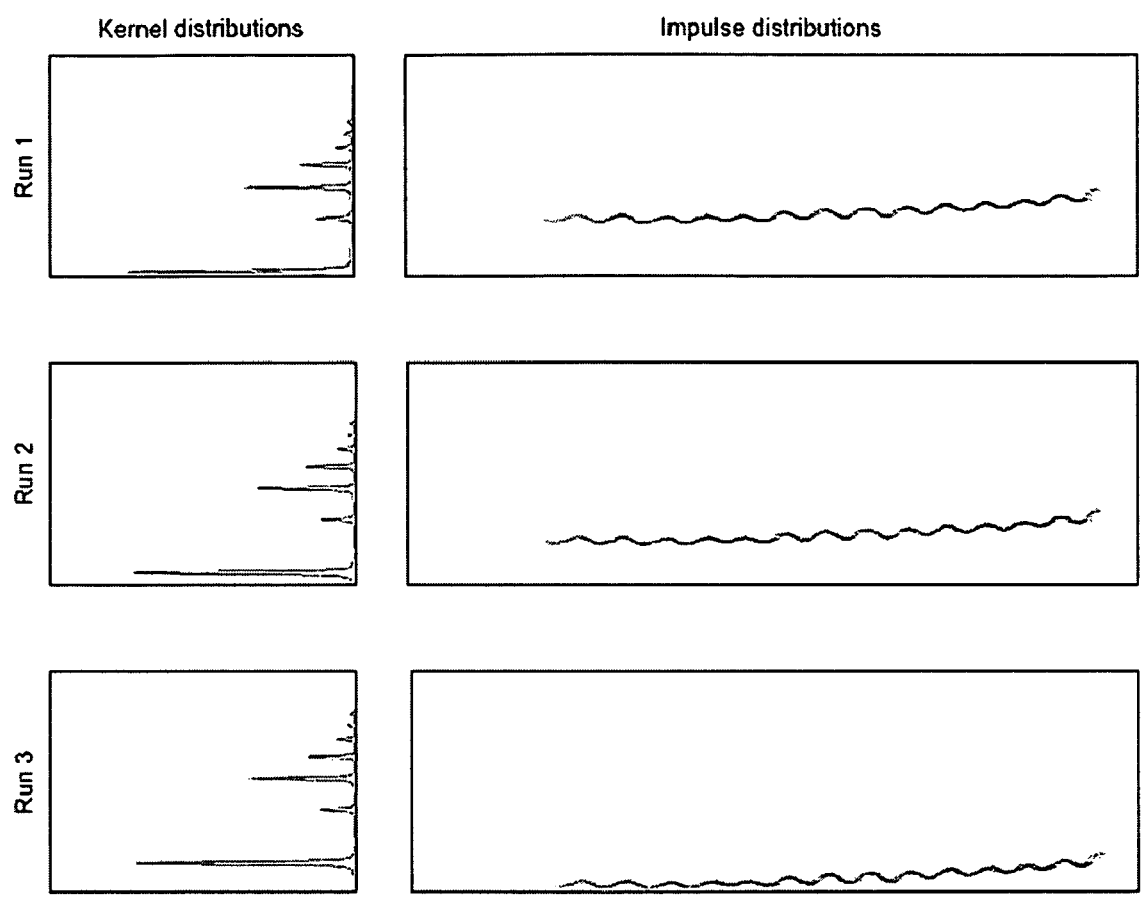
FIG. 9 show results from multiple runs on a constant-Q transform, according to one embodiment, and illustrates relative pitch tracking.

As has been mentioned, embodiments of the probabilistic pitch tracking method may extract relative pitch tracks, and may not compute an absolute pitch. This means that, at any point in time, embodiments may not know what the pitch is, but rather how much the changes. To illustrate this, consider the plots in FIG. 9, which show results from multiple runs on the constant-Q transform 122 shown in FIG. 1. Note that, although in a qualitative sense the results appear identical, there are vertical shifts between the three runs. When the kernel distribution is positioned higher in the frequency axis, the impulse distribution is positioned lower, and vice-versa. This shift is counterbalanced between the kernel distribution and the impulse distribution such that, when convolved, the result is the same output. However, as a consequence the impulse distribution between multiple runs may not be on the same shift. This means that some embodiments may measure the relative pitch changes in the input, but may not estimate or infer the actual pitch values. In some embodiments, the fundamental in the kernel distribution may be detected and marked, and used to infer the pitch values.

Relationship of Output Intensity to Input Intensity

In embodiments, there may be a relationship of the intensity of the output to the intensity of the input. As the intensity of the input fluctuates across time, a similar fluctuation in the intensity of the impulse distribution across time may be seen. This effect may be seen in various examples provided herein, especially during the attack portion where the impulse distribution transitions from faint to strong as it follows a performed crescendo. Additionally, at times where an instrument is not performing, no intensity in the impulse distribution is observed. Overall, the impulse distribution is modulated in intensity in a similar way as the input. This means that the resulting output does not only encode the position of the spectral structure being tracked, but also its intensity. To extract an actual pitch distribution, the columns of the impulse distribution may need to be normalized to integrate to unity and thus obtain an estimate that is free of intensity modulations. This may result in a plausible pitch track value for times where the input is silent, and thus may also require the need for silence detection. However, not normalizing the impulse distribution, so that it also encodes the input's intensity, tends to result in easy to parse results that may also provide valuable timing information.

Results

As an example, an embodiment of the probabilistic pitch tracking method was applied to a recording of a woodwind quintet. The method was applied to mixtures of clips of two instruments from the recording at a time. Since the probabilistic pitch tracking method described herein does not always converge to the same solution, for testing purposes the method may be run for multiple trials, in this example for one hundred trials on each of three data sets (each data set a mixture of two instruments) that are used. The results of the trials may be compared to ground truth for each of the data sets. The ground truth is obtained by finding the position of the peak of the constant-Q transforms of solo instruments (see, e.g., FIGS. 8B and 8C) at each time step (frame). The relative pitch track obtained in each of the trials is aligned with this ground truth data.

FIGS. 10A and 10B illustrate overlay plots of the aligned pitch tracks. The resulting pitch tracks from one hundred trials on a mixture of a clarinet and a flute may be aligned and overlaid, as illustrated in FIGS. 10A and 10B respectively. As can be seen in FIGS. 10A and 10B, the majority of the trials (using the first mixture) converge to the same correct solution. In this example test, 92% of the trials actually converge to an almost identical solution. Two error metrics are then computed. For the first metric, the percentage of misclassified frames in each of the trials is found. A frame may be considered misclassified if the estimated pitch differs from the ground truth by more than one constant-Q bin, as this corresponds to half a semitone using a constant-Q transform with 24 bins/octave. The mean and the standard deviation of this error percentage for are computed each instrument over the one hundred trials. For the second metric, the difference between the estimated pitch and the ground truth (in number of constant-Q bins) is found at each frame. The mean and standard deviation of the number of bins over all one hundred trials is then found.

FIG. 11 shows a table that presents results of this error analysis for three data sets (mixtures of two instruments). The mean and standard deviation of the error over each metric is found for each instrument. For a given error metric, the mean and standard deviation for each instrument are indicated by their subscripts. As seen in the table of FIG. 11, the results are very satisfactory for the first two mixtures. The error using the first metric is between 2.22% and 6.89%. The error using the second metric is always less than 1 bin. If the best ninety-two trials are used for the first mixture, the errors go down to less than 1% and less than 0.1 bins. The errors are higher in the third mixture. However, the error using the second metric is still less than 3 bins.

EXAMPLES

FIGS. 12 through 16, and the following description thereof, provide several examples of application of embodiments of the probabilistic pitch tracking method to complex input signals, including input signals for which conventional pitch tracking techniques may result in unreliable estimates.

Single Source, Monophonic Examples

Figure 12:
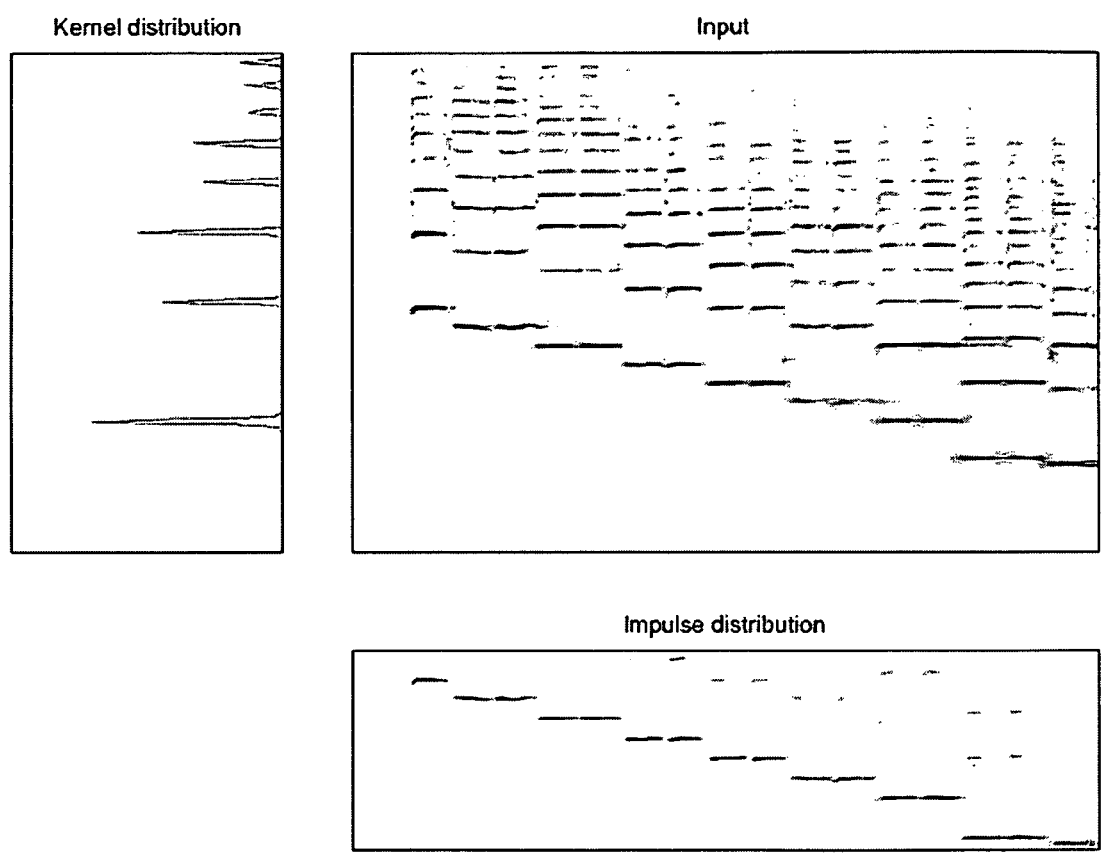
FIG. 12 illustrates pitch tracking an input signal of a violin performing a descending arpeggio, according to one embodiment.
Figure 13:
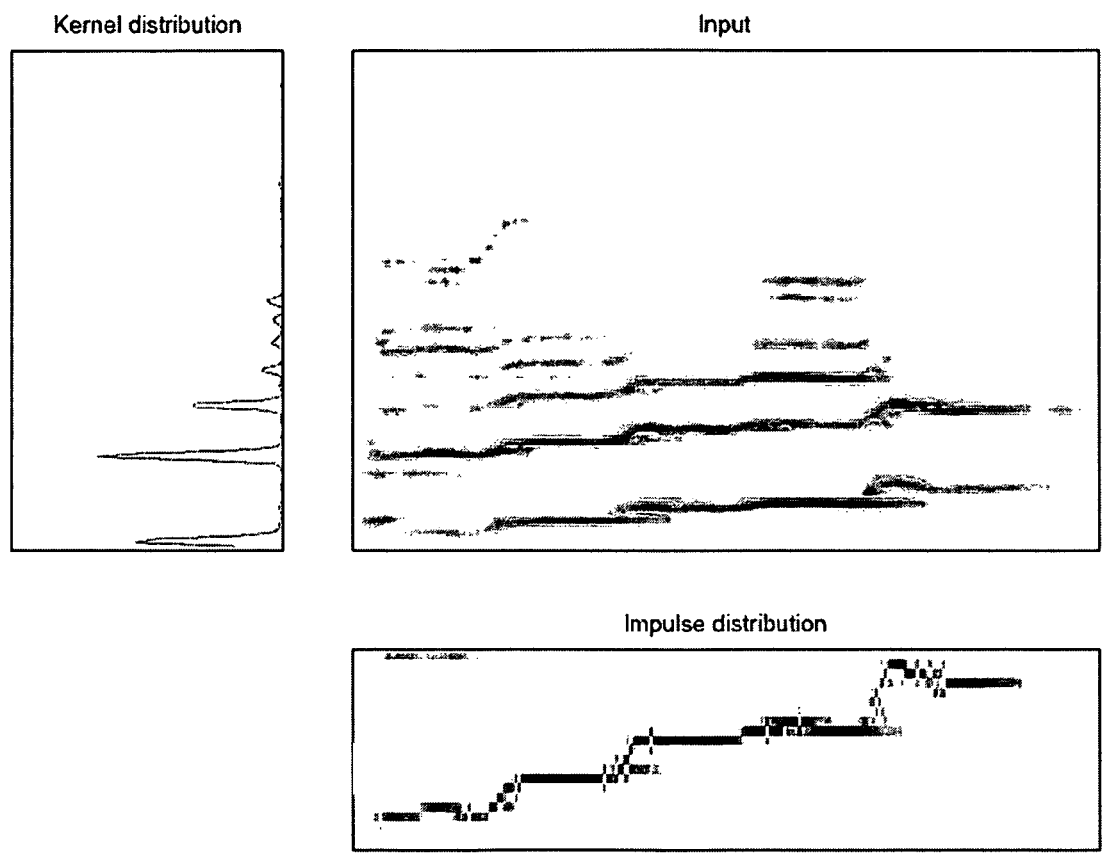
FIG. 13 illustrates pitch tracking an input signal with a singing voice with a changing spectral character, according to one embodiment.
Figure 14:
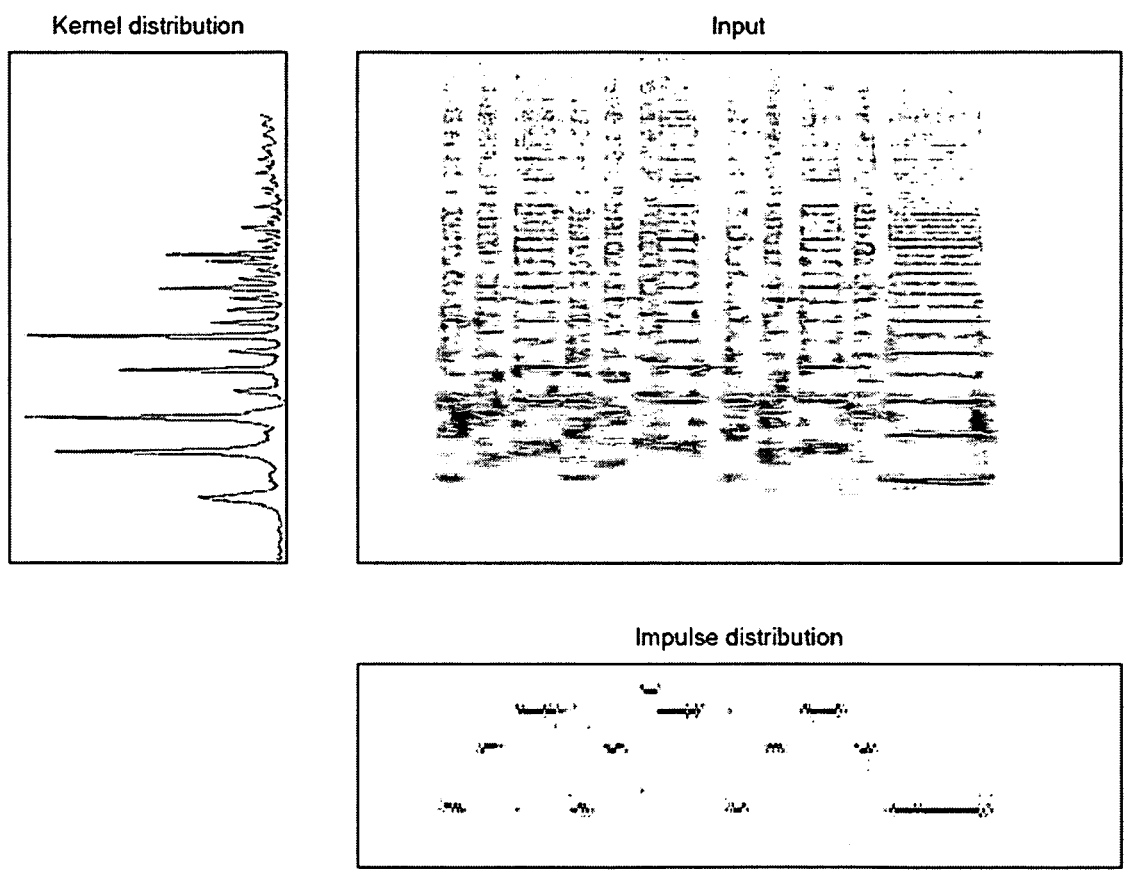
FIG. 14 illustrates pitch tracking a highly inharmonic input signal, according to one embodiment.

Results from analyzing real sound samples containing only one note instance at a time are shown in FIGS. 12 through 14. The first sound sample is a violin recording performing a descending arpeggio with each note (except the first and the last) played twice in succession. The signal was analyzed from a frequency range of 300 Hz to 8000 Hz. The results of the analysis are shown in FIG. 12. The top right plot (Input) is the input constant-Q transform. The top left plot (kernel distribution) is the extracted spectrum of the sound, and the bottom plot (impulse distribution) is the inferred pitch track. The kernel distribution is clearly a harmonic series on a constant-Q frequency scale, and the impulse distribution clearly shows the notes that were played. Subtle nuances such as the pitch correction at the beginning of the first note as well as the double note repeats can be easily seen. There are some artifacts, mostly in the form of octave repeats, which are especially evident during the lowest notes. Since this representation displays the likelihood of pitch, these are not necessarily erroneous estimates since they are clearly of lower likelihood than the actual note, and represent the periodicity along the frequency axis of the constant-Q transform. In any case, picking the maximal values of each column of the impulse distribution may easily result in the correct relative pitch estimate at that time.

Another, more challenging example is shown in FIG. 13, which is an example of pitch tracking a singing voice with a changing spectral character. The analyzed source is a vocal recording of the first five notes of a major scale, each note being sung with a different vowel. This example may be used to test the assumption that the spectrum of the input has to be constant. As is clearly seen in the Figure, the spectral character of each note is substantially different from the others. The top left plot (kernel distribution) is the extracted spectrum of the input and the bottom plot (impulse distribution) is the implied pitch track. Examining the results, an averaged spectrum is observed as the converged kernel distribution and an appropriate pitch track from the impulse distribution. It is important to stress this robustness when dealing with spectrally dynamic sounds, since an assumption of a constant spectrum is unrealistic for real recordings. It is known that musical instruments exhibit a varying formant character at different registers and that not all notes can be modeled as a simple shift of others. As can be seen by the provided examples, including the example in FIG. 13, the constant spectrum assumption is not very strict, and does not pose any serious problems.

Yet another example of the monophonic cases is shown in FIG. 14, which is provided to show how embodiments handle highly inharmonic sounds. The input in FIG. 14 is the first four bars of a recording that features a guitar pattern of an interval of a fifth being appropriately transposed to form a characteristic melody. The guitar sound is highly distorted which, in addition to the fact that the melody involves multiple notes, creates a highly inharmonic sound which technically does not exhibit pitch. However, since the same sound is being transposed to form a melody, it is clearly perceived by a human listener as a melodic sequence. FIG. 14 shows the results of the analysis. Despite the absence of a strict pitch at any point in time, the transposed chord sequence forms a melody that is clearly represented in the impulse distribution. The melodic line is clearly displayed in the impulse distribution, and the spectral profile of the source as represented by the kernel distribution is as expected a highly inharmonic and busy spectral pattern.

Single Source, Multiple Notes

Figure 15:
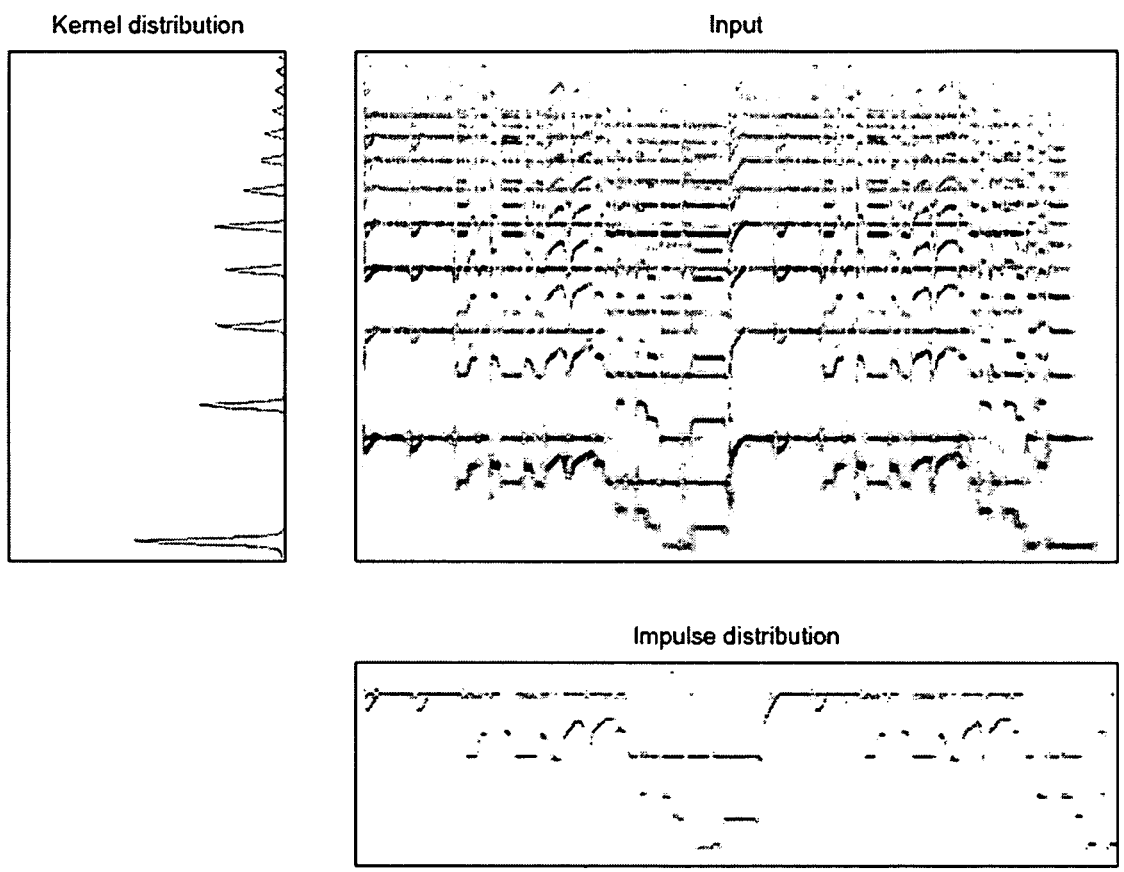
FIG. 15 illustrates pitch tracking an input signal with a country violin recording involving the continuous simultaneous sounding of two notes, according to one embodiment.

Since the model used in embodiments is additive, embodiments are also able to deal with multiple notes. An example of this case is shown in FIG. 15, which shows an analysis of a country violin recording that involves the continuous simultaneous sounding of two notes. The impulse distribution clearly represents the two notes at any point in time and provides an accurate description of the melodic content. As expected, the analysis of this sound results in an impulse distribution that has multiple peaks at each time frame that represent the two notes sounding at that point. In the impulse distribution, it is easy to see the long sustained notes and the simultaneous ornamental fiddle playing.

Multiple Sources, Multiple Notes

Figure 16:
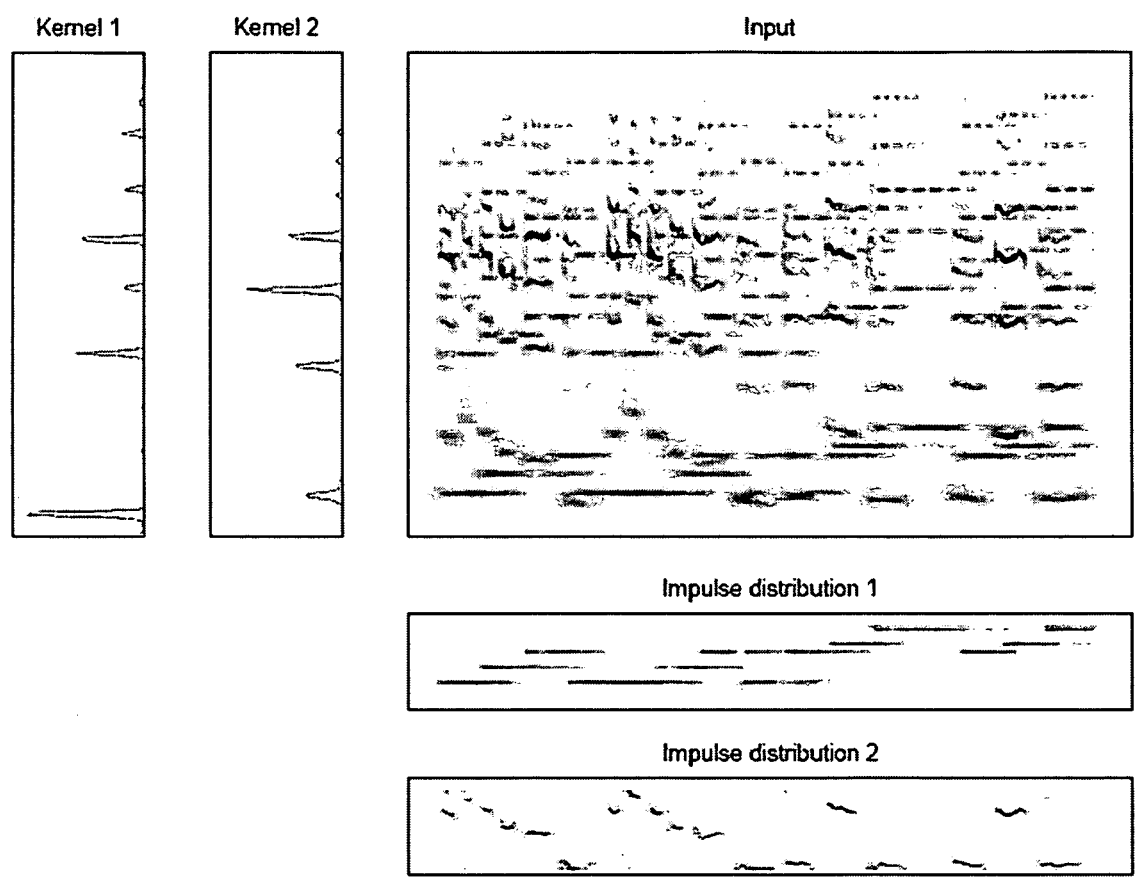
FIG. 16 illustrates pitch tracking an input signal with multiple different sources playing different melodies, according to one embodiment.

FIG. 16 illustrates an example with multiple different sources playing different melodies in the input signal. The input is a recording of a singing voice accompanied by tubular bells playing a few bars from the round "Frère Jacques". In this case, because the spectral characteristics of the two sources are distinct, the harmonic voice vs. the inharmonic tubular bells, embodiments need to perform an analysis in which the latent variable assumes two values. This means that embodiments will be estimating two kernel and impulse distributions, each fitting into the pattern of each source. The results of the analysis are shown in FIG. 16, which illustrates an analysis of a mixture of two different sources performing simultaneous notes. As shown in FIG. 16, the analysis results in two kernel distributions and two impulse distributions, each pair describing one of the two sources. The top right plot displays the constant-Q transform of the input. The two left plots show the two extracted kernel distributions, and the two bottom right plots show the impulse distributions that contain the recovered pitch tracks of the two sources. Note that the second and fifth to last notes were performed an octave higher, and the displayed results do not exhibit an octave error. As is evident from FIG. 16, the input is a very dense distribution where the included melodies are very hard to spot visually. Regardless, the information is there and embodiments may extract the information as shown in FIG. 16. Upon examining the impulse distributions, the structure of the two melodies can easily be observed. Likewise, examining the recovered kernel distributions, the two different spectra that represent the characteristics of the two sources in the mixture can easily be observed.

The approach of using multiple spectral templates may also be beneficial when attempting to recover the pitch track of a source that is contaminated by additive noise. In this situation, it can be expected that one kernel distribution will latch on to the spectrum of the source that is to be tracked, and that another kernel distribution will latch on to the background noise source. The impulse distribution corresponding to the tracked source will again be the pitch track, whereas the other impulse distribution will converge to some less structured form that is adequate to describe the presence of noise but will not carry any information about pitch. Provided with an invertible frequency transform, an embodiment may use this information to selectively reconstruct the input and thus isolate the melody of each individual source.

Other Applications

While embodiments are generally described in regards to application to audio input that includes sound, e.g. recordings of musical instruments or speech, embodiments may be adapted to address problems in other signal processing areas than audio signal processing in which a signal to be analyzed has some analog to pitch. For example, an embodiment may be adapted to monitoring vibrations, for example vibrations of machinery such as motors. When multiple motors are running, vibration-measuring device(s) may be used to record the vibration of the motors; each motor may have its own frequency of vibration. An embodiment of the probabilistic pitch tracking method may be adapted to monitor the pitch of the recorded vibrations and thus to track how the motors are running.

Embodiments may also be applied to signals in the electromagnetic spectrum, for example in the area of spectral chemical analysis or process monitoring, for processes that have a time-varying signal analogous to pitch, to monitor how elements in the process are changing over time. Even more generally, embodiments may be applied to any kind of constant Q transform (or other type of transform) of sources that have fairly regular frequency characteristics.

Example System

Various components of embodiments of a probabilistic pitch tracking module as described herein may be executed on one or more computer systems, which may interact with various other devices. One such computer system is illustrated by FIG. 17. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a probabilistic pitch tracking module, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 8, memory 720 may include program instructions 725, configured to implement embodiments of a probabilistic pitch tracking module as described herein, and data storage 735, comprising various data accessible by program instructions 725. In one embodiment, program instructions 725 may include software elements of a probabilistic pitch tracking module as illustrated in the above Figures. Data storage 735 may include data that may be used in embodiments. In other embodiments, other or different software elements and data may be included.

Those skilled in the art will appreciate that computer system 700 is merely illustrative and is not intended to limit the scope of a probabilistic pitch tracking module as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
performing, by one or more computers:
applying a transform technique to an input signal to generate a transform of the input signal, wherein the transform is a time-frequency representation with a logarithmically spaced frequency axis;
decomposing the transform of the input signal to estimate one or more kernel distributions and one or more impulse distributions, wherein each kernel distribution represents a spectrum of a particular source in the input signal and each impulse distribution represents a relative pitch track for a particular source in the input signal, and wherein each impulse distribution corresponds to a respective one of the kernel distributions, wherein said decomposing the transform of the input signal comprises imposing a prior on each impulse distribution so that each impulse distribution follows pitch expectations of a particular source; and
displaying the one or more kernel distributions and the one or more impulse distributions.

2. The computer-implemented method as recited in claim 1, further comprising storing the one or more kernel distributions and the one or more impulse distributions.

3. The computer-implemented method as recited in claim 1, further comprising displaying the transform of the input signal.

4. The computer-implemented method as recited in claim 1, wherein the input signal is a single source, monophonic input signal in which the source generates one note at a time.

5. The computer-implemented method as recited in claim 1, wherein the input signal is inharmonic.

6. The computer-implemented method as recited in claim 1, wherein the input signal is a single source input signal in which the source plays multiple notes at one time.

7. The computer-implemented method as recited in claim 1, wherein the input signal includes multiple different sources.

8. The computer-implemented method as recited in claim 7, wherein at least two of the multiple different sources play different melodies.

9. The computer-implemented method as recited in claim 1, wherein the prior is a sliding-Gaussian Dirichlet prior.

10. The computer-implemented method as recited in claim 1, wherein the prior is an entropic prior.

11. The computer-implemented method as recited in claim 1, wherein said decomposing the transform of the input signal comprises imposing a temporal continuity constraint on each impulse distribution.

12. The computer-implemented method as recited in claim 11, wherein the temporal continuity constraint is implemented according to a Kalman filter type smoothing technique.

13. The computer-implemented method as recited in claim 1, wherein said decomposing the transform of the input signal is performed according to shift-invariant probabilistic latent component analysis (PLCA).

14. The computer-implemented method as recited in claim 1, wherein said decomposing the transform of the input signal comprises applying an expectation maximization (EM) algorithm to estimate the kernel distributions and the impulse distributions.

15. The computer-implemented method as recited in claim 1, wherein the transform is a constant-Q transform.

16. A system, comprising:
at least one processor; and
a memory comprising program instructions, wherein the program instructions are executable by the at least one processor to:
apply a transform technique to an input signal to generate a transform of the input signal, wherein the transform is a time-frequency representation with a logarithmically spaced frequency axis;
decompose the transform of the input signal to estimate one or more kernel distributions and one or more impulse distributions, wherein each kernel distribution represents a spectrum of a particular source in the input signal and each impulse distribution represents a relative pitch track for a particular source in the input signal, and wherein each impulse distribution corresponds to a respective one of the kernel distributions, wherein, to decompose the transform of the input signal, the program instructions are executable by the at least one processor to impose a prior on each impulse distribution so that each impulse distribution follows pitch expectations of a particular source; and
store the one or more kernel distributions and the one or more impulse distributions to the memory.

17. The system as recited in claim 16, wherein the system further comprises a display device, and wherein the program instructions are executable by the at least one processor to display the one or more kernel distributions and the one or more impulse distributions to the display device.

18. The system as recited in claim 16, wherein the program instructions are executable by the at least one processor to store the transform of the input signal to the memory.

19. The system as recited in claim 16, wherein the input signal is a single source, monophonic input signal in which the source generates one note at a time.

20. The system as recited in claim 16, wherein the input signal is inharmonic.

21. The system as recited in claim 16, wherein the input signal is a single source input signal in which the source plays multiple notes at one time.

22. The system as recited in claim 16, wherein the input signal includes multiple different sources.

23. The system as recited in claim 22, wherein at least two of the multiple different sources play different melodies.

24. The system as recited in claim 16, wherein the prior is a sliding-Gaussian Dirichlet prior.

25. The system as recited in claim 16, wherein the prior is an entropic prior.

26. The system as recited in claim 16, wherein, to decompose the transform of the input signal, the program instructions are executable by the at least one processor to impose a temporal continuity constraint on each impulse distribution.

27. The system as recited in claim 26, wherein the program instructions are executable by the at least one processor to implement the temporal continuity constraint according to a Kalman filter type smoothing technique.

28. The system as recited in claim 16, wherein, to decompose the transform of the input signal, the program instructions are executable by the at least one processor to apply shift-invariant probabilistic latent component analysis (PLCA) to the transform.

29. The system as recited in claim 16, wherein, to decompose the transform of the input signal, the program instructions are executable by the at least one processor to apply an expectation maximization (EM) algorithm to estimate the kernel distributions and the impulse distributions.

30. The system as recited in claim 16, wherein the transform is a constant-Q transform.

31. A non-transitory computer-readable storage medium storing program instructions, wherein the program instructions are computer-executable to implement:
   applying a transform technique to an input signal to generate a transform of the input signal, wherein the transform is a time-frequency representation with a logarithmically spaced frequency axis;
   decomposing the transform of the input signal to estimate one or more kernel distributions and one or more impulse distributions, wherein each kernel distribution represents a spectrum of a particular source in the input signal and each impulse distribution represents a relative pitch track for a particular source in the input signal, and wherein each impulse distribution corresponds to a respective one of the kernel distributions, wherein said decomposing the transform of the input signal comprises imposing a prior on each impulse distribution so that each impulse distribution follows pitch expectations of a particular source; and
   displaying the one or more kernel distributions and the one or more impulse distributions.

32. The non-transitory computer-readable storage medium as recited in claim 31, wherein the program instructions are computer-executable to implement storing the one or more kernel distributions and the one or more impulse distributions.

33. The non-transitory computer-readable storage medium as recited in claim 31, wherein the program instructions are computer-executable to implement displaying the transform of the input signal.

34. The non-transitory computer-readable storage medium as recited in claim 31, wherein the input signal is a single source, monophonic input signal in which the source generates one note at a time.

35. The non-transitory computer-readable storage medium as recited in claim 31, wherein the input signal is inharmonic.

36. The non-transitory computer-readable storage medium as recited in claim 31, wherein the input signal is a single source input signal in which the source plays multiple notes at one time.

37. The non-transitory computer-readable storage medium as recited in claim 31, wherein the input signal includes multiple different sources.

38. The non-transitory computer-readable storage medium as recited in claim 37, wherein at least two of the multiple different sources play different melodies.

39. The non-transitory computer-readable storage medium as recited in claim 31, wherein the prior is a sliding-Gaussian Dirichlet prior.

40. The non-transitory computer-readable storage medium as recited in claim 31, wherein the prior is an entropic prior.

41. The non-transitory computer-readable storage medium as recited in claim 31, wherein, in said decomposing the transform of the input signal, the program instructions are computer-executable to implement imposing a temporal continuity constraint on each impulse distribution.

42. The non-transitory computer-readable storage medium as recited in claim 41, wherein the temporal continuity constraint is implemented according to a Kalman filter type smoothing technique.

43. The non-transitory computer-readable storage medium as recited in claim 31, wherein said decomposing the transform of the input signal is performed according to shift-invariant probabilistic latent component analysis (PLCA).

44. The non-transitory computer-readable storage medium as recited in claim 31, wherein, in said decomposing the transform of the input signal, the program instructions are computer-executable to implement applying an expectation maximization (EM) algorithm to estimate the kernel distributions and the impulse distributions.

45. The non-transitory computer-readable storage medium as recited in claim 31, wherein the transform is a constant-Q transform.

* * * * *